United States Patent
Yu

(10) Patent No.: US 11,532,234 B2
(45) Date of Patent: Dec. 20, 2022

(54) VEHICLE CONTROLLER, VEHICLE CONTROL METHOD, AND STORAGE MEDIUM

(71) Applicant: HONDA MOTOR CO., LTD., Tokyo (JP)

(72) Inventor: Kaijiang Yu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 16/985,250

(22) Filed: Aug. 5, 2020

(65) Prior Publication Data

US 2021/0043088 A1 Feb. 11, 2021

(30) Foreign Application Priority Data

Aug. 9, 2019 (JP) .............................. JP2019-147945

(51) Int. Cl.
*G08G 1/16* (2006.01)
*B60W 30/095* (2012.01)
(Continued)

(52) U.S. Cl.
CPC ............ *G08G 1/167* (2013.01); *B60W 30/09* (2013.01); *B60W 30/0953* (2013.01);
(Continued)

(58) Field of Classification Search
CPC .. G08G 1/167; B60W 30/09; B60W 30/0953; B60W 30/0956; B60W 30/18163; B60W 60/0025; B60W 2552/53
See application file for complete search history.

(56) References Cited

U.S. PATENT DOCUMENTS

| 9,235,767 B2* | 1/2016 | Fukata ................... G08G 1/167 |
| 2010/0231718 A1* | 9/2010 | Nakamori ............ G06V 20/588 |
| | | 348/148 |

(Continued)

FOREIGN PATENT DOCUMENTS

| JP | 2000-052808 | 2/2000 |
| JP | 2015-175824 | 10/2015 |
| JP | 2018-202966 | 12/2018 |

OTHER PUBLICATIONS

Japanese Notice of Allowance for Japanese Patent Application No. 2019-147945 dated May 31, 2022.

*Primary Examiner* — Abby Y Lin
*Assistant Examiner* — Danielle Marie Jackson
(74) *Attorney, Agent, or Firm* — Amin, Turocy & Watson, LLP

(57) ABSTRACT

A vehicle controller includes a first detector that detects a traveling state of a host vehicle, a second detector that detects a traveling state of an other vehicle that travels along a main lane when the host vehicle is traveling along a merging road, a marking line recognizer that recognizes a marking line of the main lane, and a merging controller that performs merging control of the host vehicle into the main lane based on a transverse moving situation of the other vehicle detected by the second detector, wherein, when a marking line of the main lane is unable to be recognized by the marking line recognizer, the merging controller delays starting of the merging control in comparison with a case in which the marking line of the main lane is able to be recognized by the marking line recognizer.

7 Claims, 17 Drawing Sheets

(51) Int. Cl.
*B60W 60/00* (2020.01)
*B60W 30/09* (2012.01)
*B60W 30/18* (2012.01)

(52) U.S. Cl.
CPC .. *B60W 30/0956* (2013.01); *B60W 30/18163* (2013.01); *B60W 60/0025* (2020.02); *B60W 2552/53* (2020.02)

(56) References Cited

U.S. PATENT DOCUMENTS

| | | | |
|---|---|---|---|
| 2011/0130936 A1* | 6/2011 | Noda | G08G 1/167 |
| | | | 701/70 |
| 2017/0203770 A1* | 7/2017 | Kondo | B60W 60/005 |
| 2018/0174462 A1* | 6/2018 | Um | B60W 30/12 |
| 2018/0194363 A1* | 7/2018 | Sugiura | B60W 30/14 |
| 2020/0098266 A1* | 3/2020 | Tanaka | B60W 30/08 |
| 2020/0279488 A1* | 9/2020 | Shibasaki | B60W 30/10 |
| 2021/0253108 A1* | 8/2021 | Ito | B60W 40/105 |

\* cited by examiner

VEHICLE CONTROLLER, VEHICLE CONTROL METHOD, AND STORAGE MEDIUM

CROSS-REFERENCE TO RELATED APPLICATION

Priority is claimed on Japanese Patent Application No. 2019-147945, filed Aug. 9, 2019, the content of which is incorporated herein by reference.

BACKGROUND OF THE INVENTION

Field of the Invention

The present invention relates to a vehicle controller, a vehicle control method, and a storage medium.

Description of Related Art

In the related art, a technology of a vehicle traffic management device configured to calculate block sections that are control standards for controlling an intervehicular distance or speeds of vehicles on the basis of a detection result of a road environment and detection results of positions and speeds of the vehicles, and configured to control a plurality of traveling vehicles safely and densely by performing determination of whether to change the traveling lane of the vehicle based on the block sections is disclosed (for example, Japanese Unexamined Patent Application, First Publication No. 2000-52808).

SUMMARY OF THE INVENTION

However, in the technology of the related art, appropriate lane changing may not be performed when detection of a road environment such as a marking line or the like is insufficient.

An aspect of the present invention is directed to providing a vehicle controller, a vehicle control method, and a program stored in a storage medium that are capable of performing a stable lane changing even when detection of a road environment is insufficient.

A vehicle controller, a vehicle control method, and a storage medium according to the present invention employ the following configurations.

(1) A vehicle controller according to an aspect of the present invention includes a first detector configured to detect a traveling state of a host vehicle; a second detector configured to detect a traveling state of an other vehicle that travels along a main lane when the host vehicle is traveling along a merging road; a marking line recognizer configured to recognize a marking line that divides one or more lanes included in the main lane; and a merging controller configured to perform merging control of merging the host vehicle with the main lane on the basis of a transverse moving situation of the other vehicle detected by the second detector, wherein, when a marking line that divides a plurality of lanes included in the main lane is unable to be recognized by the marking line recognizer, the merging controller delays starting of the merging control in comparison with a case in which the marking line that divides the plurality of lanes included in the main lane is able to be recognized by the marking line recognizer.

(2) In the aspect of the above-mentioned (1), the second detector may virtually set a frame including a reference place of the other vehicle with respect to the other vehicle, the merging controller performs the merging control on the basis of a position of the frame, and the second detector may offset the frame from the other vehicle in a direction separating from the merging road when it is detected that traveling state of the other vehicle is in a lane-changing state.

(3) In the aspect of the above-mentioned (2), the second detector may suppress the offset of the frame when the marking line is not recognized by the marking line recognizer.

(4) In the aspect of the above-mentioned (2) or (3), the second detector may shorten a length of the frame in a direction of advancement when the other vehicle that does not perform lane changing between the lanes included in the main lane is detected in the main lane in comparison with a case in which the other vehicle that performs lane changing between the lanes included in the main lane is detected.

(5) In the aspect of any one of the above-mentioned (1) to (4), when it is detected by the second detector that the other vehicle makes a lane change from a first lane along which the other vehicle is traveling to a second lane which is farther from the merging road than the first lane among the main lane, the merging controller may perform deceleration control of the host vehicle from a first time point when the other vehicle has started the lane change until a second time point when the other vehicle crosses a marking line, lateral speed limitation of the host vehicle from the second time point until a third time point when a moving speed of the other vehicle in a lateral direction with respect to a direction of advancement of the other vehicle becomes a predetermined level or less, and acceleration limitation of the host vehicle from the third time point until a fourth time point when the host vehicle has reached a predetermined distance before an end of the merging road.

(6) In the aspect of any one of the above-mentioned (1) to (5), the vehicle controller may further include a third detector configured to detect a traveling state of a merging vehicle that is traveling along the merging road when the host vehicle is traveling along the merging road, wherein the merging controller performs the merging control of the host vehicle to the main lane further based on a detection result by the third detector.

(7) A vehicle control method according to an aspect of the present invention is performed by a computer, the vehicle control method including: detecting a traveling state of a host vehicle; detecting a traveling state of an other vehicle that travels along a main lane when the host vehicle is traveling along a merging road and recognizing a marking line that divides one or more lanes included in the main lane; and performing merging control of merging the host vehicle with the main lane on the basis of a detected transverse moving situation of the other vehicle, wherein, when a marking line that divides a plurality of lanes included in the main lane is unable to be recognized, starting of the merging control is delayed in comparison with a case in which the marking line that divides the plurality of lanes included in the main lane is able to be recognized.

(8) A storage medium according to an aspect of the present invention in which a program is stored is provided, the program configured to cause a computer to: detect a traveling state of a host vehicle; detect a traveling state of an other vehicle that travels along a main lane when the host vehicle is traveling along a mergingn road, recognize a marking line that divides one or more lanes included in the main lane; and perform merging control of merging the host vehicle into the main lane on the basis of a detected transverse moving situation of the other vehicle, wherein, when a marking line that divides a plurality of lanes included in the main lane is unable to be recognized, starting of the merging control is delayed in comparison with a case in which the marking line that divides the plurality of lanes included in the main lane is able to be recognized.

According to the aspects of the above-mentioned (1) to (8), when the marking line is not recognized and the host vehicle merges with the main lane on the basis of the lane changing of the other vehicle, the host vehicle can merge with the main lane stably.

In addition, according to the aspects of the above-mentioned (2) to (4), when the host vehicle is controlled to merge with the main lane on the basis of a virtual frame, the host vehicle can smoothly merge with the main lane.

In addition, according to the aspect of the above-mentioned (5), it is possible to urge the other vehicles to change lane by making the host vehicle to approach or to separate from the main lane, to perform warning to the vehicle behind the other vehicle and to make notification with repect to the other vehicle so that the host vehicle can more easily merge with the main lane.

DETAILED DESCRIPTION OF THE INVENTION

Hereinafter, embodiments of a vehicle controller, a vehicle control method, and a storage medium of the present invention will be described with reference to the accompanying drawings. Further, the vehicle controller of the embodiment is applied to an automated driving vehicle. The automated driving is, for example, controlling both of steering and acceleration of the vehicle to execute driving control. The vehicle controller of the embodiment may be applied to the vehicle that performs driving assistance such as an adaptive cruise control system (ACC), a lane keeping assistance system (LKAS), or the like.

First Embodiment

Entire Configuration

Figure 1:
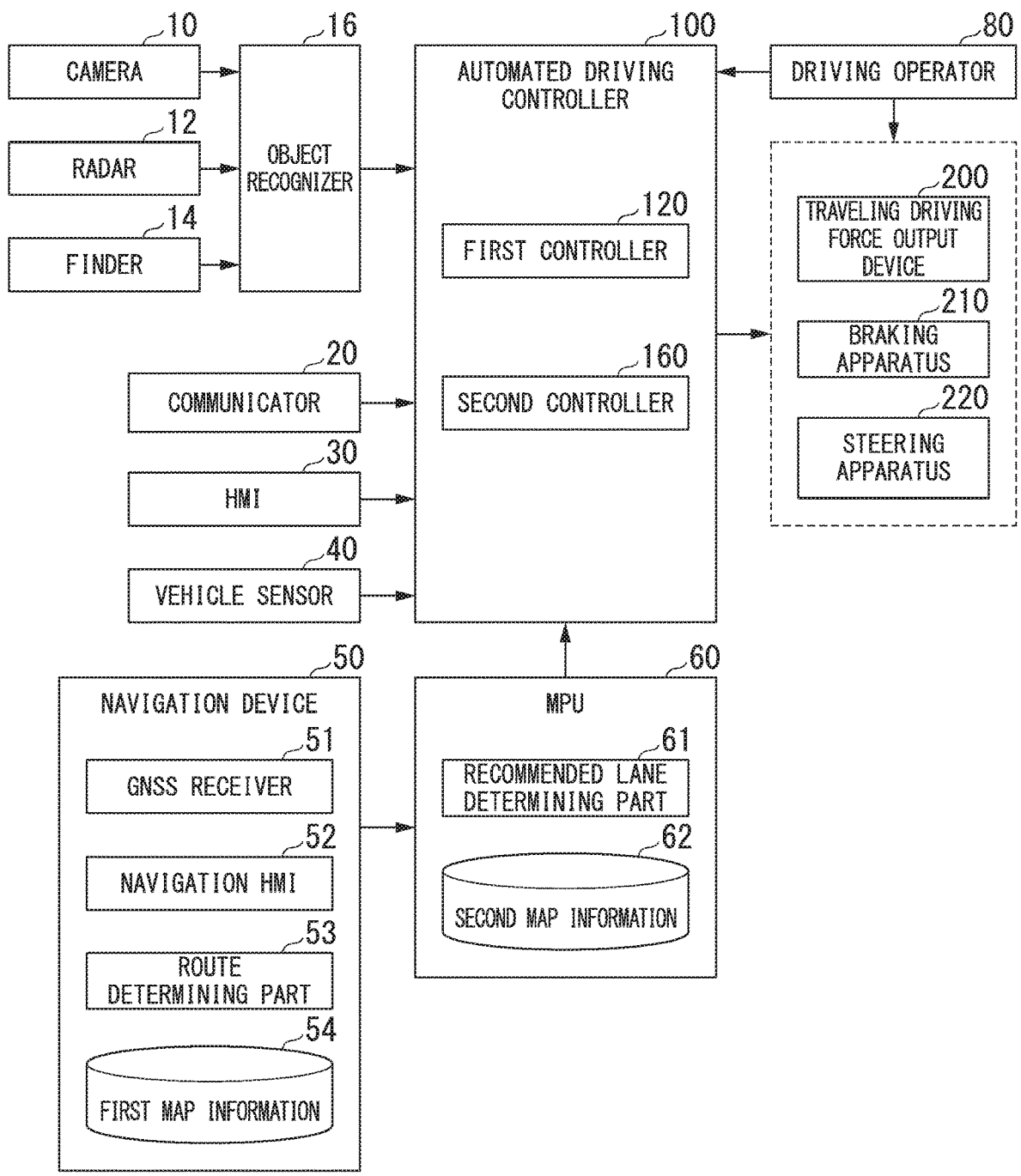
FIG. 1 is a configuration view of a vehicle system using a vehicle controller of a first embodiment.

FIG. 1 is a configuration view of a vehicle system 1 using a vehicle controller 100 of a first embodiment. A vehicle on which the vehicle system 1 is mounted is, for example, a two-wheeled, three-wheeled or four-wheeled vehicle, and a driving source thereof is an internal combustion engine such as a diesel engine, a gasoline engine, or the like, an electric motor, or a combination thereof. The electric motor is operated using an output generated from a generator connected to the internal combustion engine, or an output discharged from a secondary battery or a fuel cell.

The vehicle system 1 includes, for example, a camera 10, a radar 12, a finder 14, an object recognizer 16, a driving operator 80, the vehicle controller 100, a traveling driving force output device 200, a braking apparatus 210 and a steering apparatus 220. These devices or mechanisms are connected to each other by a multiple communication line such as a controller area network (CAN) communication line or the like, a serial communication line, a wireless communication line, or the like. Further, the configuration shown in FIG. 1 is merely an example, and a part of the configuration may be omitted, and other components may be added thereto.

The camera 10 is a digital camera using a solid-state image sensing device such as a charge coupled device (CCD), a complementary metal oxide semiconductor (CMOS), or the like. The camera 10 is attached to an arbitrary place of the vehicle (hereinafter, a host vehicle M) in which the vehicle system 1 is mounted. When a side in front of the vehicle is imaged, the camera 10 is attached to an upper section of a front windshield, a back surface of a rearview mirror, or the like. For example, the camera 10 images the surroundings of the host vehicle M periodically repeatedly. The camera 10 may be a stereo camera.

The radar 12 detects radio waves reflected by an object (reflected waves) to detect at least a position (a distance and an azimuth) of an object while the radio waves such as millimeter waves or the like are radiated to the surroundings of the host vehicle M. The radar 12 is attached to an arbitrary place of the host vehicle M. The radar 12 may detect a position and a speed of an object using a frequency modulated continuous wave (FM-CW) method.

The finder 14 is a light detection and ranging (LIDAR) device. The finder 14 radiates light to surroundings of the host vehicle M and measures scattered light. The finder 14 detects a distance to an object on the basis of a time from light emission to light reception. The radiated light is, for example, pulse-form laser light. The finder 14 is attached to an arbitrary place of the host vehicle M.

The object recognizer 16 recognizes a position, a type, a speed, or the like, of the object by performing sensor fusion processing with respect to a detection result using some or all of the camera 10, the radar 12, and the finder 14. The object recognizer 16 outputs the recognition result to the vehicle controller 100. The object recognizer 16 may output detection results of the camera 10, the radar 12, and the finder 14 to the vehicle controller 100 as they are. The object recognizer 16 may be omitted from the vehicle system 1.

A communicator 20 communicates with another vehicle present around an automated driving vehicle using, for example, a cellular network, a Wi-Fi network, Bluetooth (Registered mark), dedicated short range communication (DSRC), or the like, or communicates with various server devices via a radio base station. The communicator 20 is an example of "a communication part."

An HMI 30 receives inputs of operations of an occupant in the automated driving vehicle while providing various pieces of information to the occupant. The HMI 30 may include display devices, speakers, buzzers, touch panels, switches, keys, and the like, of various types.

Vehicle sensors 40 include a vehicle speed sensor configured to detect a speed of the automated driving vehicle, an acceleration sensor configured to detect an acceleration, a yaw rate sensor configured to detect an angular speed around a vertical axis, an azimuth sensor configured to detect an orientation of the automated driving vehicle, and the like.

A navigation device 50 includes, for example, a global navigation satellite system (GNSS) receiver 51, a navigation HMI 52 and a route determining part 53. The navigation device 50 stores first map information 54 in a storage such as a hard disk drive (HDD), a flash memory, or the like. The GNSS receiver 51 identifies a position of the automated driving vehicle on the basis of a signal received from GNSS satellites. The location of the automated driving vehicle may be specified or complemented by an initial navigation system (INS) using the output from the vehicle sensors 40. The navigation HMI 52 includes a display device, a speaker, a touch panel, a key, and the like. The navigation HMI 52 may be partially or entirely shared by the above-mentioned HMI 30. For example, the route determining part 53 determines a route (hereinafter, a route on a map) to a destination input by the occupant using the navigation HMI 52 from a location (or an input arbitrary position) of the automated driving vehicle specified by the GNSS receiver 51 with reference to the first map information 54. For example, the first map information 54 is information in which a road shape is expressed by a link showing a road and nodes connected by the link. The first map information 54 may include a curvature of a road, point of interest (POI) information, or the like. The route on a map is output to an MPU 60. The navigation device 50 may perform route guidance using the navigation HMI 52 on the basis of the route on a map. The navigation device 50 may be realized by a function of a terminal device, for example, a smartphone, a tablet terminal, or the like, possessed by the occupant. The navigation device 50 may transmit a current location and a destination to a navigation server via the communicator 20, and may acquire an equivalent route as the route on a map from the navigation server.

The MPU 60 includes, for example, a recommended lane determination part 61, and holds second map information 62 in a storage such as an HDD, a flash memory, or the like. The recommended lane determination part 61 divides the route on a map provided from the navigation device 50 into a plurality of blocks (for example, dividing at every 100 [m] in a vehicle advancing direction), and determines a recommended lane at each block with reference to the second map information 62. The recommended lane determination part 61 determines the number of the lane from the left on which the automated driving vehicle will travel. The recommended lane determination part 61 determines a recommended lane such that the automated driving vehicle can travel on a reasonable route to advance to a branch destination when a diverging point is present in the route on a map.

The second map information 62 is map information that is more accurate than the first map information 54. The second map information 62 includes, for example, information of a center of a lane, information of boundaries of a lane, or the like. In addition, the second map information 62 may include road information, traffic regulations information, address information (address/zip code), facility information, telephone number information, and the like. The second map information 62 may be updated at any time when the communicator 20 communicates with another device.

The driving operators 80 include, for example, an accelerator pedal, a brake pedal, a shift lever, a steering wheel, a modified steer, a joystick, and other operators. A sensor configured to detect an operation amount or an existence of an operation is attached to the driving operator 80, and a detection result thereof is output to some or all of the vehicle controller 100, the traveling driving force output device 200, the braking apparatus 210 and the steering apparatus 220.

The vehicle controller 100 includes, for example, a first controller 120 and a second controller 160. Each of the first controller 120 and the second controller 160 is realized by executing a program (software) using a hardware processor such as a central processing unit (CPU) or the like. In addition, some or all of these components may be realized by hardware (a circuit part; including circuitry) such as a large scale integration (LSI), an application specific integrated circuit (ASIC), a field-programmable gate array (FPGA), a graphics processing unit (GPU), or the like, or may be realized by cooperation between software and hardware. The program may be previously stored in a storage such as an HDD, a flash memory, or the like, of the vehicle controller 100 (a storage including a non-transient storage medium), stored in a detachable storage medium such as a DVD, a CD-ROM, or the like, or installed in an HDD or a flash memory of the vehicle controller 100 by mounting the storage medium (the non-transient storage medium) on a drive device.

Figure 2:
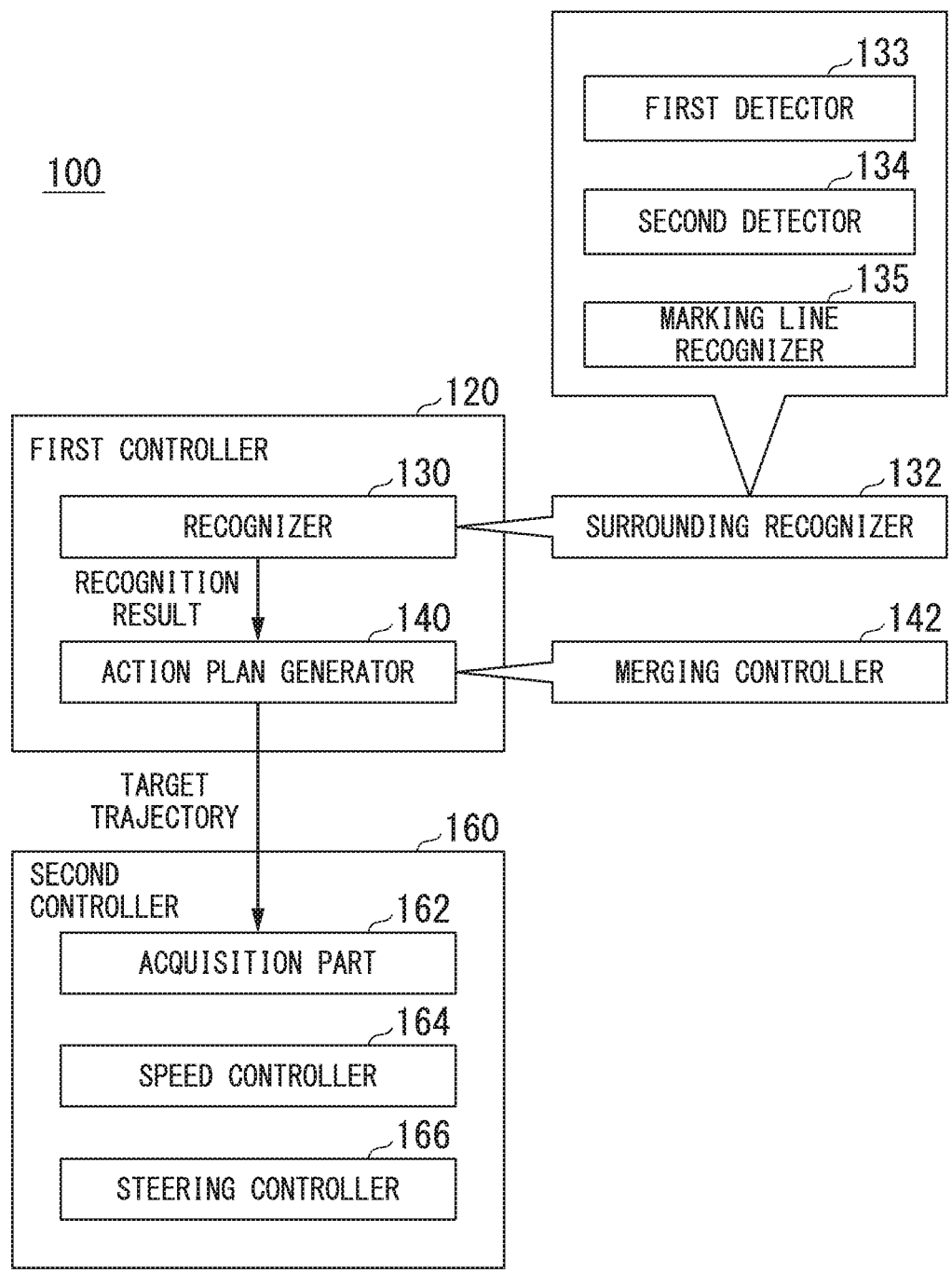
FIG. 2 is a functional configuration view of a first controller and a second controller.

FIG. 2 is a functional configuration view of the first controller 120 and the second controller 160. The first controller 120 includes, for example, a recognizer 130 and an action plan generator 140. For example, the first controller 120 may realize both of a function of artificial intelligence (AI) and a function of a previously provided model at the same time. For example, regarding a function of "recognizing a crossroad", recognition of a crossroad through deep learning or the like and recognition based on a predetermined condition (a signal, road markings, or the like that are able to be detected by pattern matching) may be executed in parallel, and the function of "recognizing a crossroad" may be realized by scoring and comprehensively evaluating them. Accordingly, reliability of automated driving is guaranteed.

The recognizer 130 recognizes surroundings of the host vehicle M, and estimates behaviors of recognized target objects. The recognizer 130 includes, for example, a surrounding recognizer 132.

The surrounding recognizer 132 recognizes a state such as a position, a speed, an acceleration, or the like, of an object (a preceding vehicle, an oncoming vehicle, a main lane vehicle that travels along a main lane of a junction road, or the like) present around the automated driving vehicle on the basis of the information input from the camera 10, the radar 12, and the finder 14 via the object recognizer 16. For example, the position of the object is recognized as a position on absolute coordinates using a representative point (a center of gravity, a driving axial center, or the like) of the automated driving vehicle as an origin, and used for control. The position of the object may be displayed at a representative point such as a center of gravity, a corner, or the like, of the object, or may be displayed as a representative region. The "state" of the object may include an acceleration, a jerk, or "an action state" (for example, whether a lane change by the preceding vehicle of the host vehicle M is being performed or a lane change is planned to be performed) of the object.

The surrounding recognizer 132 recognizes a position and an attitude of the automated driving vehicle with respect to a traveling lane when the traveling lane is recognized. The surrounding recognizer 132 may recognize, for example, a separation of a reference point of the automated driving vehicle from a lane center and an angle with respect to a line that connects centers of lanes in a direction of advancement of the automated driving vehicle as a relative position and an attitude of the automated driving vehicle with respect to the traveling lane. Instead of this, the surrounding recognizer 132 may recognize a position or the like of a reference point of the automated driving vehicle with respect to any side end portion (a road marking line or a road boundary) of the traveling lane as a relative position of the automated driving vehicle with respect to the traveling lane.

The surrounding recognizer 132 recognizes, for example, a lane in which the automated driving vehicle is traveling (a traveling lane). For example, the surrounding recognizer 132 recognizes a traveling lane by comparing a pattern (for example, arrangement of solid lines and broken lines) of road marking lines obtained from the second map information 62 with a pattern of road marking lines around the automated driving vehicle recognized from an image captured by the camera 10. Further, the surrounding recognizer 132 may recognize a traveling lane by recognizing course boundaries (road boundaries) including road marking lines, road shoulders, curbstones, median strips, guardrails, and the like, while not being limited to road marking lines. In the recognition, a position of the automated driving vehicle acquired from the navigation device 50 or a processing result by the INS may be added. In addition, the surrounding recognizer 132 recognizes a temporary stop line, a traffic signal, and other road events.

The surrounding recognizer 132 recognizes information related to surrounding vehicles, in particular, a roadway along which, the host vehicle M is planned to travel, on the basis of the vehicles around the host vehicle M recognized from an image captured by the camera 10, an image captured by the camera 10, traffic jam information around the host vehicle M acquired by the navigation device 50, or positional information obtained from the second map information 62. The information related to the roadway planned to travel includes, for example, a width of a lane (a width of a road) along which the host vehicle M is planned to travel.

The surrounding recognizer 132 includes, for example, a first detector 133, a second detector 134 and a marking line recognizer 135.

The first detector 133 detects a traveling state of the host vehicle M on the basis of the recognition result of the surrounding recognizer 132. The first detector 133 detects a traveling state such as a traveling position, a speed, an angular speed, or the like, of the host vehicle M when the host vehicle M travels on a merging road.

The second detector 134 detects a traveling state of another vehicle (hereinafter, main lane vehicles mN; N is a number of the traveling lane, and when a plurality of vehicles are present in the lane L1, a main lane vehicle m11, a main lane vehicle m12, a main lane vehicle m13 . . . are shown) that travels on a main lane, which is a merging destination of the host vehicle M, when the host vehicle M is traveling on the merging road on the basis of the recognition result of the surrounding recognizer 132. The second detector 134 detects a traveling state, for example, whether a main lane vehicle m1 is present, a traveling position, a speed, an angular speed, a vehicle length, or the like, of the main lane vehicle m1. In addition, the second detector 134 detects a transverse moving situation of the main lane vehicle m1, and detects whether the main lane vehicle m1 continuously travels on the lane in which the main lane vehicle m1 is traveling or is going to change a lane from the lane in which the main lane vehicle m1 is traveling. A lane L1 is an example of "a first lane."

The marking line recognizer 135 recognizes a marking line that divides one or more lanes included in a main lane on the basis of the recognition result of the surrounding recognizer 132.

The action plan generator 140 generates a target trajectory along which the host vehicle M is planned to travel in the future such that the host vehicle M travels on a recommended lane determined by the recommended lane determination part 61 in principal, and further, automated driving is performed to correspond to a surrounding situation of the host vehicle M. The target trajectory includes, for example, a speed element. For example, the target trajectory is expressed as points at which the host vehicle M should arrive (trajectory points) arranged in sequence. The trajectory point is a point at which the host vehicle M should arrive at each of predetermined traveling distances (for example, about every several [m]) as a road distance, and separately from this, a target speed and a target acceleration of each predetermined sampling period (for example, every several fractions of a [sec]) are generated as a part of the target trajectory.

The action plan generator 140 may set an event of automated driving also when generating a target trajectory. An event of automated driving includes, for example, a fixed speed traveling event, a low speed following traveling event, a lane change event, a branching-off event, a contact avoiding event, a merging event, or the like. The merging event is an event of merging the host vehicle M with a main lane at a merging point having no signal or stop line, for example, at an expressway or the like. The action plan generator 140 generates a target trajectory according to the started event.

The action plan generator 140 includes, for example, a merging controller 142. The functions of the merging controller 142 will be described below in detail.

The second controller 160 controls the traveling driving force output device 200, the braking apparatus 210, and the steering apparatus 220 such that the automated driving vehicle passes through the target trajectory generated by the action plan generator 140 at the scheduled time.

Returning to FIG. 1, the second controller 160 includes, for example, an acquisition part 162, a speed controller 164 and a steering controller 166. The acquisition part 162 acquires information of the target trajectory (the trajectory point) generated by the action plan generator 140, and stores the information in the memory (not shown). The speed controller 164 controls the traveling driving force output device 200 or the braking apparatus 210 on the basis of a speed element accompanying the target trajectory stored in the memory. The steering controller 166 controls the steering apparatus 220 according to a curve condition of the target trajectory stored in the memory. Processing of the speed controller 164 and the steering controller 166 are realized by, for example, a combination of feedforward control and feedback control. As an example, the steering controller 166 combines feedforward control according to a curvature of the road in front of the automated driving vehicle and feedback control on the basis of a separation from the target trajectory and executes them.

The traveling driving force output device 200 outputs a traveling driving force (torque) that causes the vehicle to travel to a driving wheel. The traveling driving force output device 200 includes, for example, an electronic control unit (ECU) configured to control an internal combustion engine, an electric motor, a gear box, and the like, when they are combined. The ECU controls these components according to the information input from the second controller 160 or the information input from the driving operator 80.

The braking apparatus 210 includes, for example, a brake caliper, a cylinder configured to transmit a hydraulic pressure to the brake caliper, an electric motor configured to generate a hydraulic pressure in the cylinder, and a brake ECU. The brake ECU controls the electric motor according to the information input from the second controller 160 or the information input from the driving operator 80 such that a braking torque is output to each wheel according to a braking operation. The braking apparatus 210 may include a mechanism configured to transmit a hydraulic pressure generated according to an operation of a brake pedal included in the driving operator 80 to the cylinder via a master cylinder as a back-up. Further, the braking apparatus 210 is not limited to the above-mentioned configuration and may be an electronically controlled hydraulic braking apparatus configured to control an actuator according to the information input from the second controller 160 and transmit a hydraulic pressure of the master cylinder to the cylinder.

The steering apparatus 220 includes, for example, a steering ECU and an electric motor. The electric motor changes, for example, an orientation of a steered wheel by applying a force to a rack and pinion mechanism. The steering ECU drives the electric motor and changes an orientation of the steered wheel according to the information input from the second controller 160 or the information input from the driving operator 80.

Function of Second Detector

Figure 3:
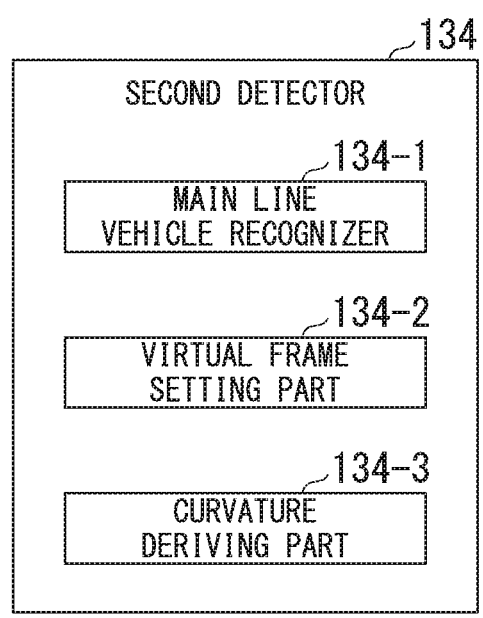
FIG. 3 is a functional configuration view of a second detector.

FIG. 3 is a functional configuration view of the second detector 134. The second detector 134 includes, for example, a main lane vehicle recognizer 134-1, a virtual frame setting part 134-2 and a curvature deriving part 134-3.

The main lane vehicle recognizer 134-1 recognizes a position, a speed, an angular speed, or the like of the main lane vehicle m1. The virtual frame setting part 134-2 sets a virtual frame that contains a reference place (a car head, a center of gravity, a front wheel axial center, a rear wheel axial center, and the like) of the main lane vehicle m1 on the basis of the recognition result of the main lane vehicle recognizer 134-1. The virtual frame is set to contain an outline of the main lane vehicle m1, for example, when the main lane vehicle m1 during straight traveling is seen in a plan view or a side view.

The curvature deriving part 134-3 derives a curvature of a traveling trajectory of the main lane vehicle m1 on the basis of the virtual frame set by the virtual frame setting part 134-2.

Function of Merging Controller

Hereinafter, a function of the merging controller 142 will be described in detail. Further, the function of the merging controller 142 described below may be a function executed according to the merging event or may be a function in the other merging control.

The merging controller 142 performs merging control of merging the host vehicle M with the main lane on the basis of the transverse moving situation of the main lane vehicle m1 detected by the second detector 134. In the merging controller 142, starting of the merging control is delayed more when the marking line that divides the plurality of lanes L1 and L2 included in the main lane cannot be recognized using the marking line recognizer 135, in comparison with the case in which the marking line that divides the plurality of lanes included in the main lane can be recognized using the marking line recognizer 135.

Hereinafter, in the order the scene progresses, processing of the first detector 133, the second detector 134, the marking line recognizer 135, and the merging controller 142 will be described with reference to FIG. 4 and FIG. 5.

Figure 4:
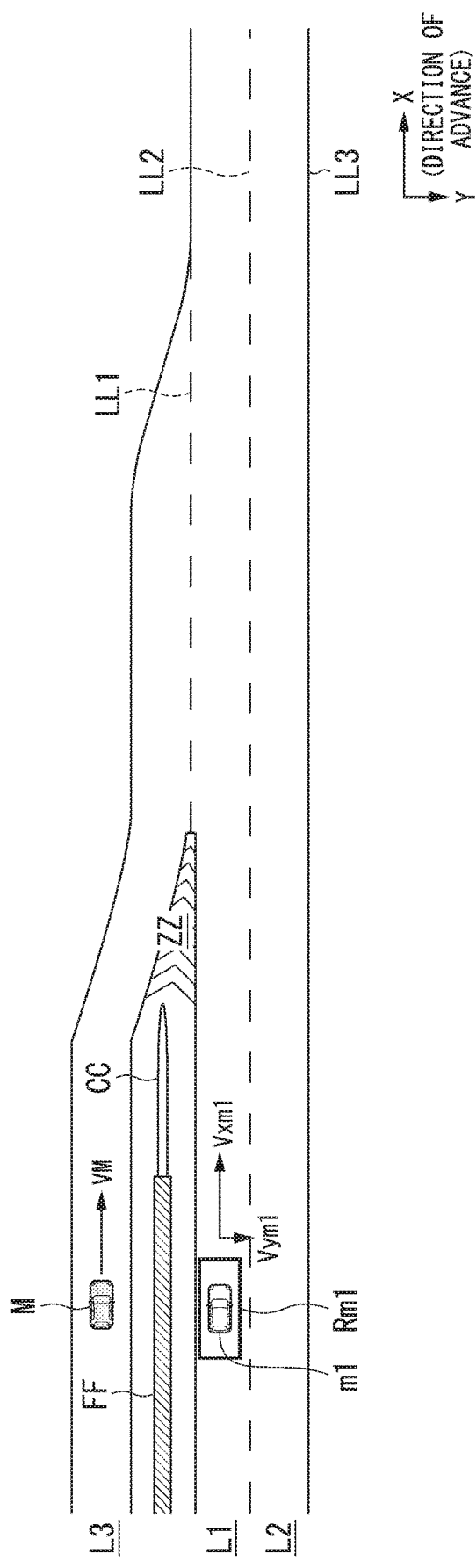
FIG. 4 is a view showing a first scene.

FIG. 4 is a view showing a first scene. The first scene is a situation before the merging control is started.

In the example of FIG. 4, the main lanes (the lane L1 and the lane L2; the lane L2 is an example of "a second lane") extending in an X-axis direction (a direction of advancement) in the drawings and a merging lane (a lane L3) that merges with the lane L1 from the left side in the direction of advancement are shown. The host vehicle M executes automated driving along a route to a destination set by the navigation device 50, and travels along the lane L1 toward a merging point (or a merging area, which will be defined below). It is assumed that there is no stop line near the merging point, and the main lane vehicle m1 is traveling in the lane L1.

Further, the lane L3, and the lane L1 and the lane L2 that are the main lanes, are divided by a fence FF, a branching-off zone CC, a zebra zone (channelizing zone) ZZ, and the like on the front side in the direction of advancement of each vehicle with respect to the merging point. While the fence FF and the branching-off zone CC physically separate the lane L1 and the lane L3, the zebra zone ZZ is only drawn on the road surface and does not physically separate the lane L1 and the lane L3. Further, the fence FF may be provided at a height where the other lane can be seen from one lane of the lane L1 and the lane L3.

The merging point is a point at which the lane L1 and the lane L3 are connected, and includes, for example, a region from a soft nose to an end nose of the lane L3. The host vehicle M needs to merge into the lane L1 before traveling the region from the soft nose to the end nose. Further, even when the host vehicle M can physically pass therethrough, it is prohibited for the host vehicle M to merge into the lane L1 by passing through the zebra zone ZZ where traffic is restricted by law.

The marking line recognizer 135 recognizes, for example, marking lines LL1 to LL3 of the main lane. The marking line LL1 and the marking line LL2 are lines that divide the lane L1. In addition, the marking line LL2 and the marking line LL3 are lines that divide the lane L2.

For example, the second detector 134 selects the main lane vehicle m1 from a timing when a reference place of the host vehicle M reaches the branching-off zone CC to a timing when the reference place of the host vehicle M reaches the soft nose that is a terminal end of the zebra zone ZZ. Further, the second detector 134 may select a vehicle adjacent to the host vehicle M and disposed behind the host vehicle M in the direction of advancement among a plurality of vehicles as the main lane vehicle m1 when the plurality of vehicles that are traveling along the lane L1 are recognized. Accordingly, the merging controller 142 can select a vehicle that is easy to use as a merging target as the main lane vehicle m1 when the host vehicle M travels the lane L3 while decelerating and merges into the lane L1 that is the main lane.

The first detector 133 detects a traveling state of the host vehicle M including a speed VM of the host vehicle M on the basis of the recognition result of the surrounding recognizer 132.

The merging controller 142 performs merging control such that the host vehicle M merges into the main lane before a timing at which the host vehicle M arrives at the end nose that is the terminal end of the lane L3.

Figure 5:
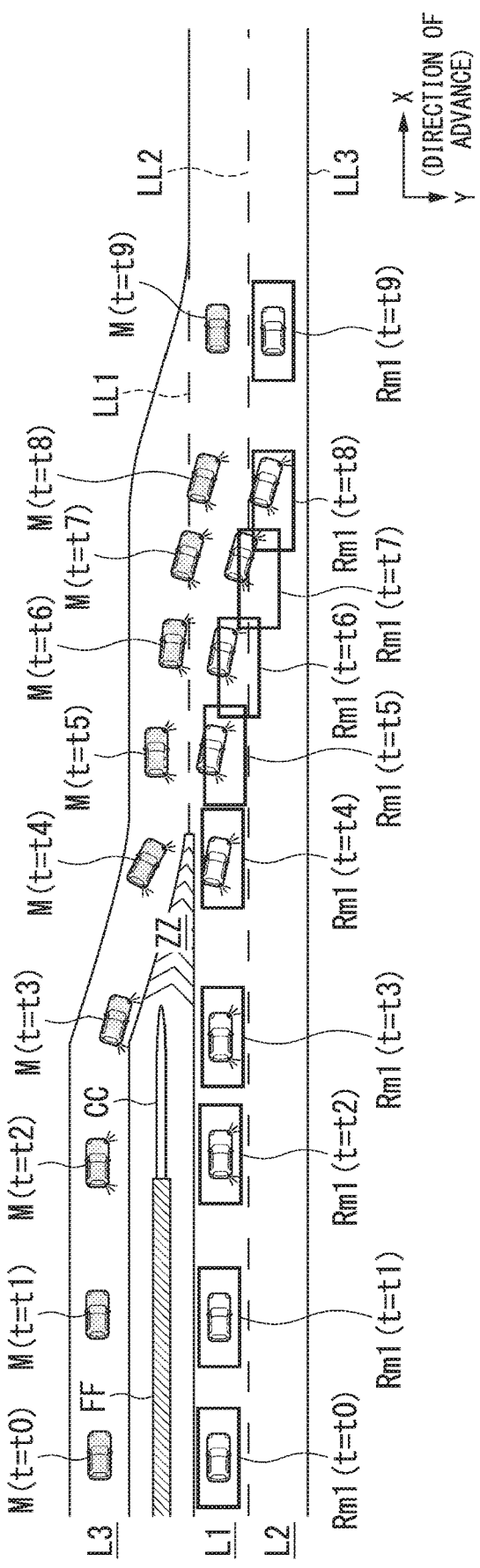
FIG. 5 is a view showing an example of setting results by a virtual frame setting part upon merging.

FIG. 5 is a view showing an example of a setting result by the virtual frame setting part 134-2 upon merging. FIG. 5 shows positions of the host vehicle M at each of times t0 to t9 until the host vehicle M changes a lane from the lane L3 to the lane L1 and a virtual frame Rm1 set on the main lane vehicle m1 by the virtual frame setting part 134-2. The time t0 to the time t9 indicate an arbitrary length of time, and may indicate a length of time of several [sec] intervals. The virtual frame Rm1 shows, for example, a prediction region of a future position of the main lane vehicle m1, and the inside of the frame shows a region where possibility of interference with the main lane vehicle m1 is high.

Further, in the following description, the time t2 will be described as a timing when the main lane vehicle m1 turns on a turn signal lamp. The time t3 will be described as the timing when the main lane vehicle m1 starts deceleration and the moving amount in the lateral direction is less than the predetermined amount. In addition, the main lane vehicle m1 will be described as starting lane changing from the lane L1 to the lane L2 at the time t4 and completing lane changing at the time t8. The moving amount of the main lane vehicle m1 in the lateral direction therebetween will be described as being more than a predetermined value. The time t9 is a time when traveling is started in a state in which the main lane vehicle m1 maintains the lane L2.

The second detector 134 detects a traveling state of the main lane vehicle m1 that travels along the main lane that is a merging destination when the host vehicle M is traveling on a merging road on the basis of the recognition result of the surrounding recognizer 132. For example, the second detector 134 detects whether the main lane vehicle m1 turns on the turn signal lamp, a speed Vxm1 of the main lane vehicle m1 in the direction of advancement, and a speed Vym1 in the direction of advancement in the lateral direction. Further, the second detector 134 may detect the speed Vym1 in the lateral direction on the basis of the recognition results of the marking lines LL1 to LL3 when the marking line recognizer 135 can recognize the main lane vehicle m1.

The virtual frame setting part 134-2 sets the virtual frame Rm1 on the basis of the detection result of the second detector 134, in particular, the speed Vym1 in the lateral direction. The virtual frame setting part 134-2 offsets the virtual frame Rm1 from the main lane vehicle m1 in a direction separating from the merging road when it is detected that the main lane vehicle m1 is in a traveling state in which lane changing is performed.

The virtual frame setting part 134-2 offsets the virtual frame Rm1 in a Y-axis direction (a direction from the lane L1 toward the lane L2) in the drawings from the time t2 as shown when it is detected that the main lane vehicle m1 is in a traveling state in which the lane changing is performed. Further, the offset amount may be set on the basis of the speed Vym1 in the lateral direction. For example, the virtual frame setting part 134-2 offsets the virtual frame Rm1 more greatly according to a magnitude of the speed Vym1 in the lateral direction when the speed Vym1 in the lateral direction is a predetermined level or more.

For example, the virtual frame setting part 134-2 sets a predetermined amount (for example, about tens of [cm]) because the offset amount of the time t3 when deceleration is started toward lane changing has a small speed Vym1 in the lateral direction in actuality. For the offset amount at the time t4 to the time t8, the virtual frame setting part 134-2 sets the offset amount according to the magnitude of the speed Vym1 in the lateral direction.

Since the virtual frame Rm1 expresses an estimation region of a future position of the main lane vehicle m1, the virtual frame setting part 134-2 offsets the virtual frame Rm1 even at the time t3 when the moving amount in the lateral direction is small.

Further, the virtual frame setting part 134-2 may offset the virtual frame Rm1 on the basis of the detection result of the speed Vxm1 in the longitudinal direction by the second detector 134 when the second detector 134 detects that the main lane vehicle m1 is in a traveling state in which the lane changing is performed. In this case, for example, the virtual frame setting part 134-2 offsets the virtual frame Rm1 toward a side behind the main lane vehicle m1 in the direction of advancement when the main lane vehicle m1 is decelerating. In addition, for example, the virtual frame setting part 134-2 offsets the virtual frame Rm1 toward a side in front of the main lane vehicle m1 in the direction of advancement when the main lane vehicle m1 is accelerating.

The curvature deriving part 134-3 performs derivation of a curvature of a traveling trajectory of the main lane vehicle m1 in order to perform merging control of merging of the host vehicle M into the main lane on the basis of the virtual frame set by the virtual frame setting part 134-2. The merging controller 142 performs prediction of a time-space action (for example, a position of the virtual frame Rm1 set at the time t0 to the time t8) and performs merging control on the basis of the derived results of the curvature deriving part 134-3.

Virtual Frame

Hereinafter, a setting example of the virtual frame Rm1 by the virtual frame setting part 134-2 will be described. The virtual frame setting part 134-2 sets the virtual frame Rm1 including at least a reference place of the main lane vehicle m1. The virtual frame setting part 134-2 sets the virtual frame Rm1 to include an outline of the main lane vehicle m1 when the main lane vehicle m1 maintains the traveling lane. The virtual frame setting part 134-2 sets the virtual frame Rm1 to include a reference place of the main lane vehicle m1 and the virtual frame Rm1 is offset toward a lane which is the lane change destination when the main lane vehicle m1 changes the lane.

Figure 6:
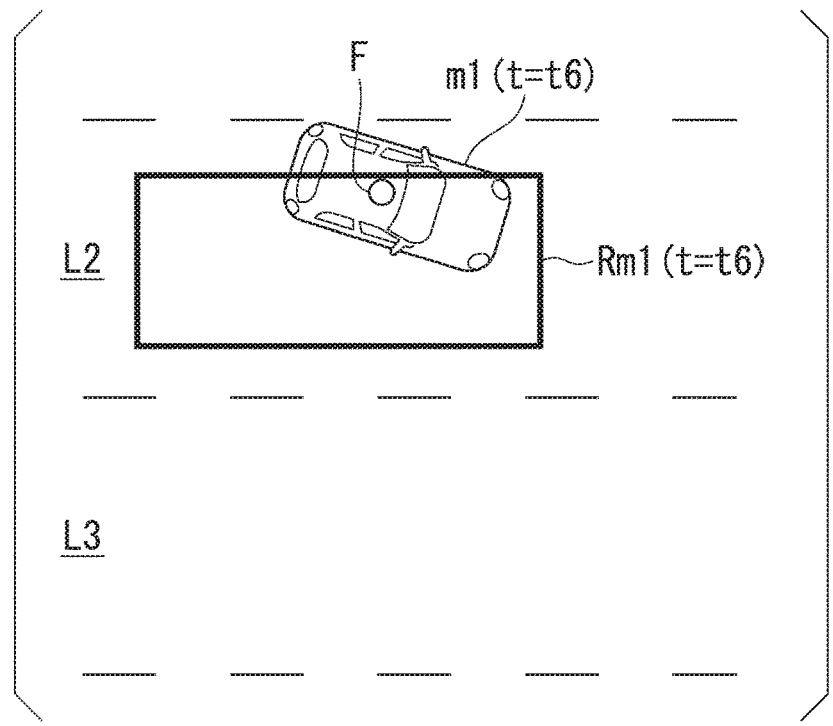
FIG. 6 is an enlarged view of a virtual frame Rm1 at a time t6.

FIG. 6 is an enlarged view of the virtual frame Rm1 at the time t6 shown in FIG. 5. The virtual frame setting part 134-2 sets the virtual frame Rm1 to include the reference place Fm1 of the main lane vehicle m1 even when the virtual frame Rm1 is offset toward the lane L3 which is the lane change destination.

Figure 7:
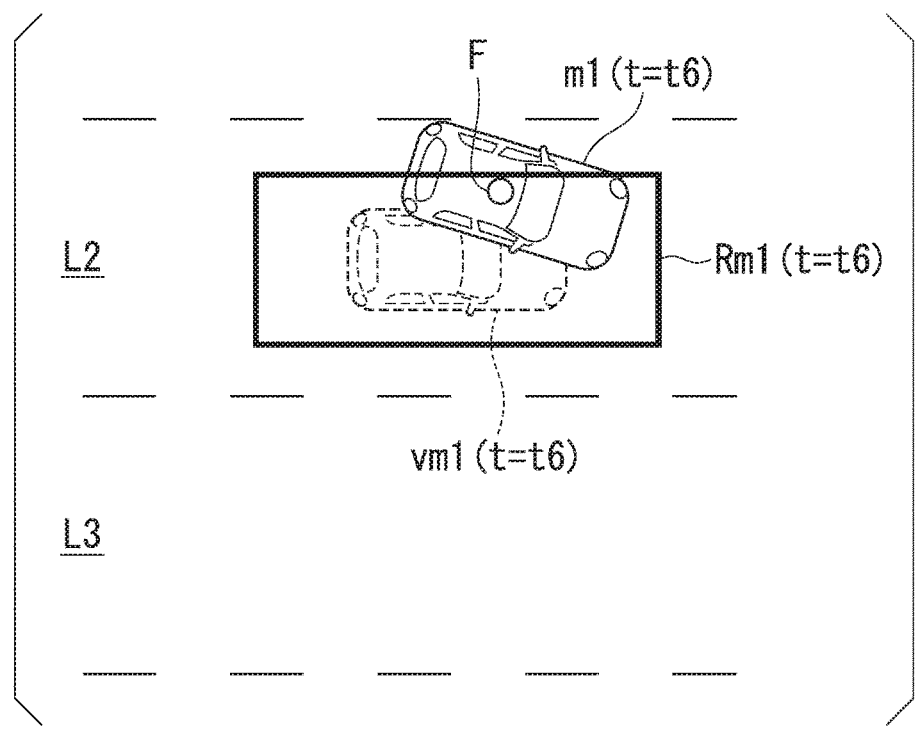
FIG. 7 is a view for describing offsetting of the virtual frame Rm1.

FIG. 7 is a view for describing offsetting of the virtual frame Rm1 shown in FIG. 6. For example, the virtual frame setting part 134-2 sets the virtual frame Rm1 with respect to a predicted attitude (vm1 in the drawings) of the main lane vehicle m1 when movement in the lateral direction is completed at the time t6.

Figure 8:
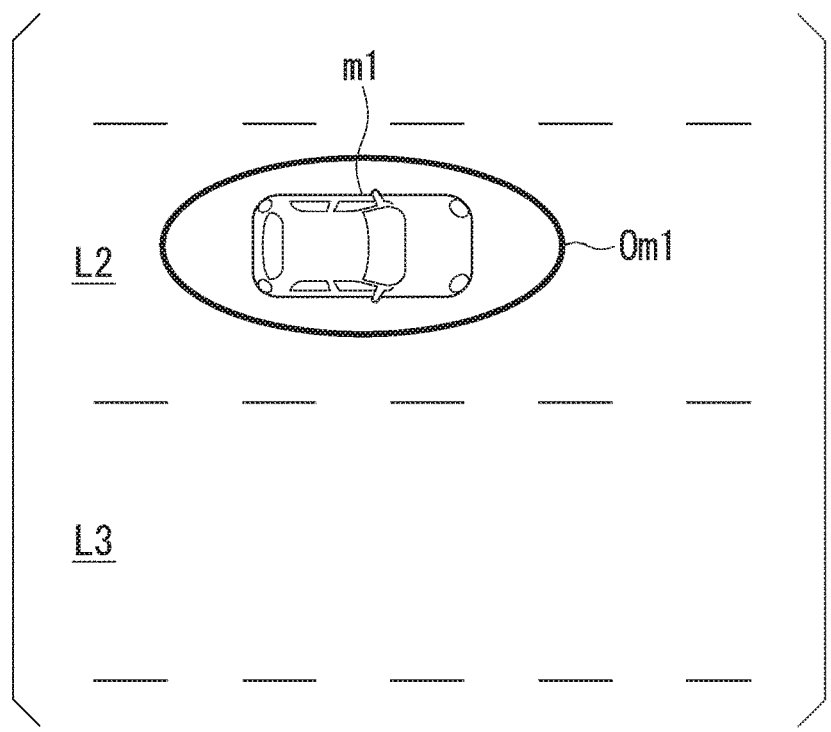
FIG. 8 is a view for describing a virtual frame Om1.

FIG. 8 is a view for describing a virtual frame Om1 having a substantially circular shape that is a variant of the virtual frame. The virtual frame Om1 is set to include the outline of the main lane vehicle m1 when the main lane vehicle m1 is seen in a plan view or a side view, like the above-mentioned rectangular virtual frame Rm1.

Figure 9:
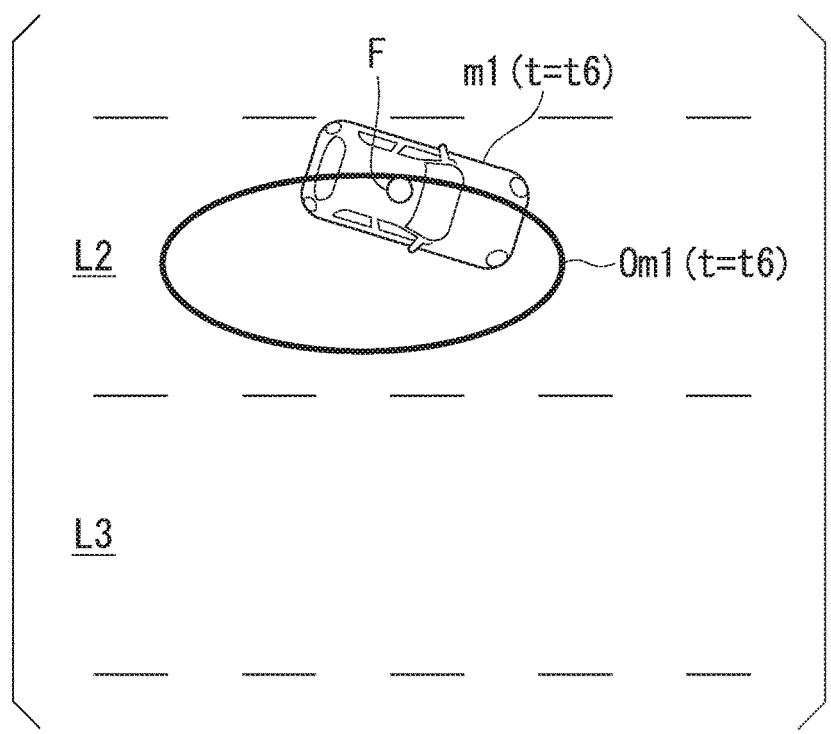
FIG. 9 is a view for describing offsetting of the virtual frame Om1.

FIG. 9 is a view for describing offsetting of the virtual frame Om1 shown in FIG. 8. The main lane vehicle m1 shown in FIG. 9 is the same as the main lane vehicle m1 at a time point of the time t6 shown in FIG. 6 and FIG. 7. The virtual frame setting part 134-2 sets the virtual frame Om1 to include a reference place Fm1 of the main lane vehicle m1 even when the virtual frame Om1 is offset toward the lane L3 which is the lane change destination. While the virtual frame will be described below as being a rectangular shape, it is not limited to the rectangular shape and may be, for example, a substantially circular shape as shown in FIG. 8 and FIG. 9 or may be a polygonal shape other than a rectangular shape.

Suppression of Offsetting

The virtual frame setting part 134-2 of the second detector 134 suppresses offsetting of the virtual frame when a part or all of the marking line included in the main lane is not recognized by the marking line recognizer 135. "Suppressing the offsetting" includes that causing offsetting not to be performed, setting a smaller offset amount, or delaying a timing of starting offsetting.

Figure 10:
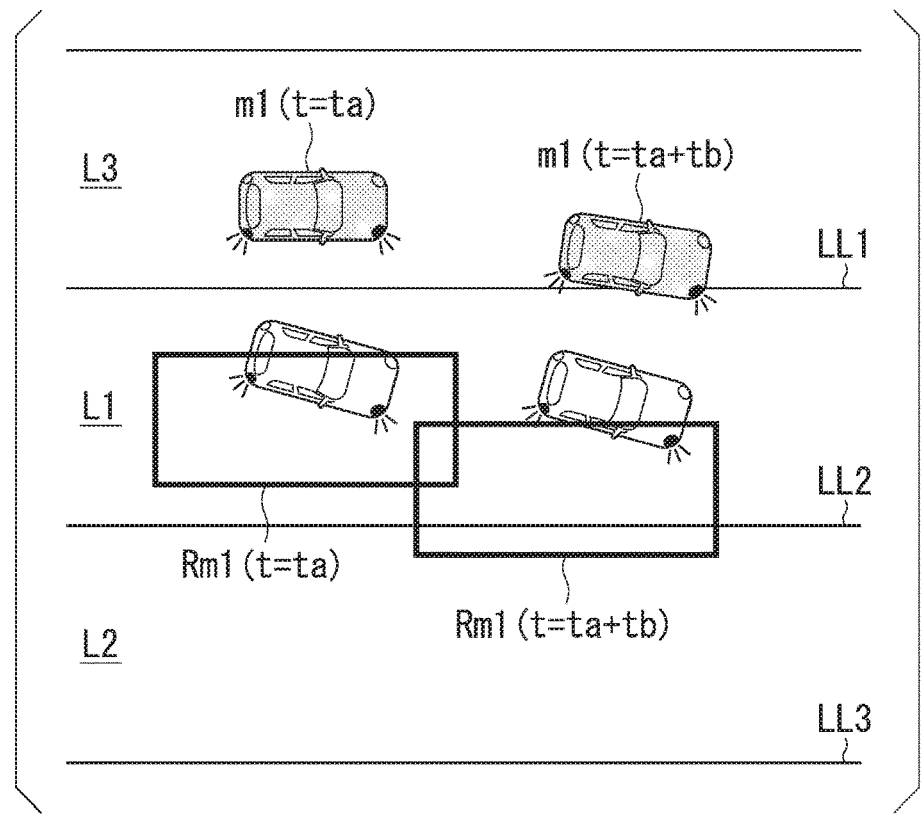
FIG. 10 is a view for describing offsetting of the virtual frame Rm1 when a marking line is recognized.

FIG. 10 is a view for describing offsetting of the virtual frame Rm1 when the marking line included in the main lane is recognized by the marking line recognizer 135. The marking line recognizer 135 recognizes the marking lines LL1 to LL3 of the lane L1 and the lane L2 at a time ta. The virtual frame setting part 134-2 offsets the virtual frame Rm1 of the main lane vehicle m1 toward the lane L2 from a time point of the time ta when it is recognized that the main lane vehicle m1 has started the lane changing at the time ta. Accordingly, the merging controller 142 can cause the host vehicle M to approach the marking line LL1 of the lane L1 and start lane changing to the lane L1 after a predetermined time tb elapses from the time ta.

Figure 11:
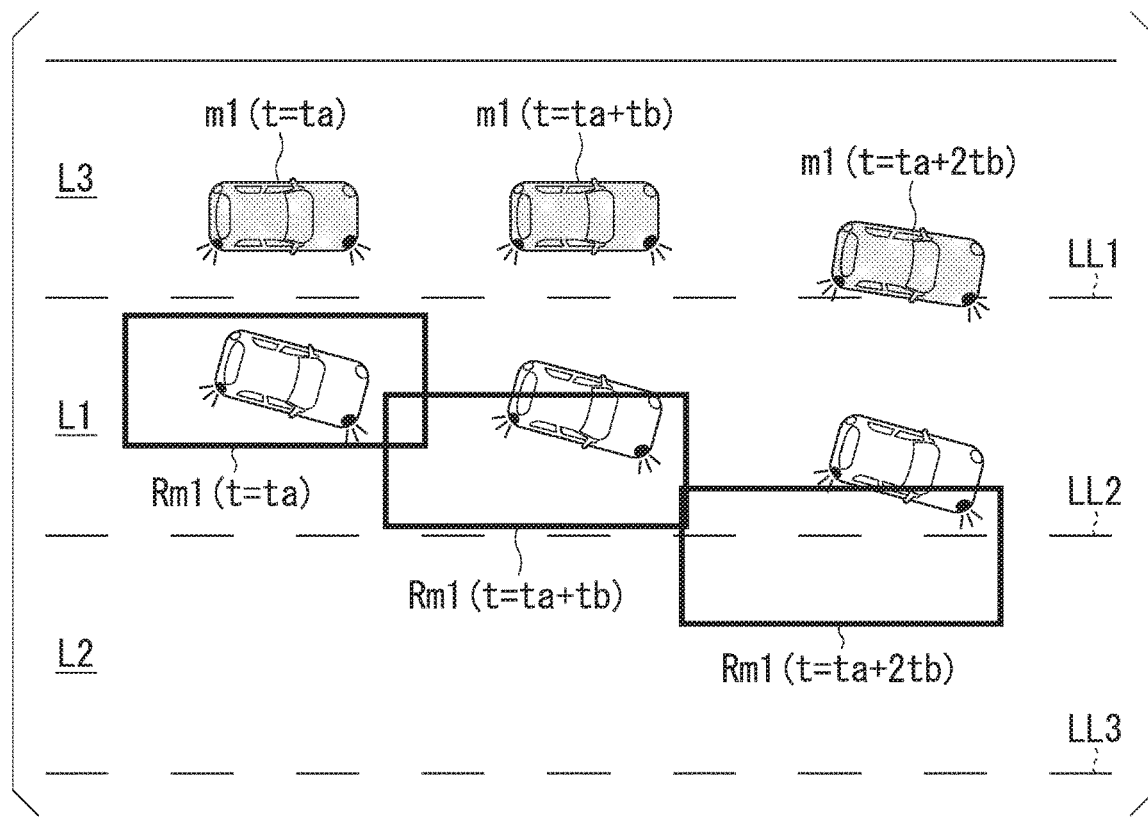
FIG. 11 is a view for describing offsetting of the virtual frame Rm1 when a marking line is not recognized.

FIG. 11 is a view for describing offsetting of the virtual frame Rm1 when the marking line included in the main lane is not recognized by the marking line recognizer 135. The marking line recognizer 135 cannot recognize some or all of the marking lines LL1 to LL3 of the lane L1 and the lane L2 at the time ta. The virtual frame setting part 134-2 does not offset the virtual frame Rm1 of the main lane vehicle m1 toward the lane L2 at a time point of the time ta when it is recognized that the main lane vehicle m1 has started the lane changing at the time ta. For example, the virtual frame setting part 134-2 starts the offsetting of the virtual frame Rm1 after the predetermined time tb elapses from the time ta. For example, the merging controller 142 causes the host vehicle M to approach the marking line LL1 of the lane L1 at the time ta+2tb after the predetermined time tb further elapses, and starts the lane changing to the lane L1. In this way, when the marking line is not recognized by the marking line recognizer 135, the merging controller 142 can start merging control more carefully.

Generation of Merging Trajectory when Marking Line is not Recognized

The merging controller 142 generates a merging trajectory of the host vehicle M on the basis of the detection result of the main lane vehicle m1 of the second detector 134 when the marking line included in the main lane is not recognized by the marking line recognizer 135. The merging controller 142 determines a trajectory curvature of the main lane vehicle m1 on the basis of the detection result of the moving amount in the lateral direction of the main lane vehicle m1 of the second detector 134. "The marking line included in the main lane is not recognized by the marking line recognizer 135" includes cases in which there is no marking line, the marking line is broken, the marking line is erased, and the marking line in the direction of advancement cannot be seen due to bad weather.

When the marking line is not recognized by the marking line recognizer 135, even though a brief position of the host vehicle can be acquired or estimated in the host vehicle M, the host vehicle M may not be able to accurately grasp the position of the host vehicle in the second map information 62. For this reason, the merging controller 142 performs merging control of the host vehicle M on the basis of the detection result of the main lane vehicle m1.

Figure 12:
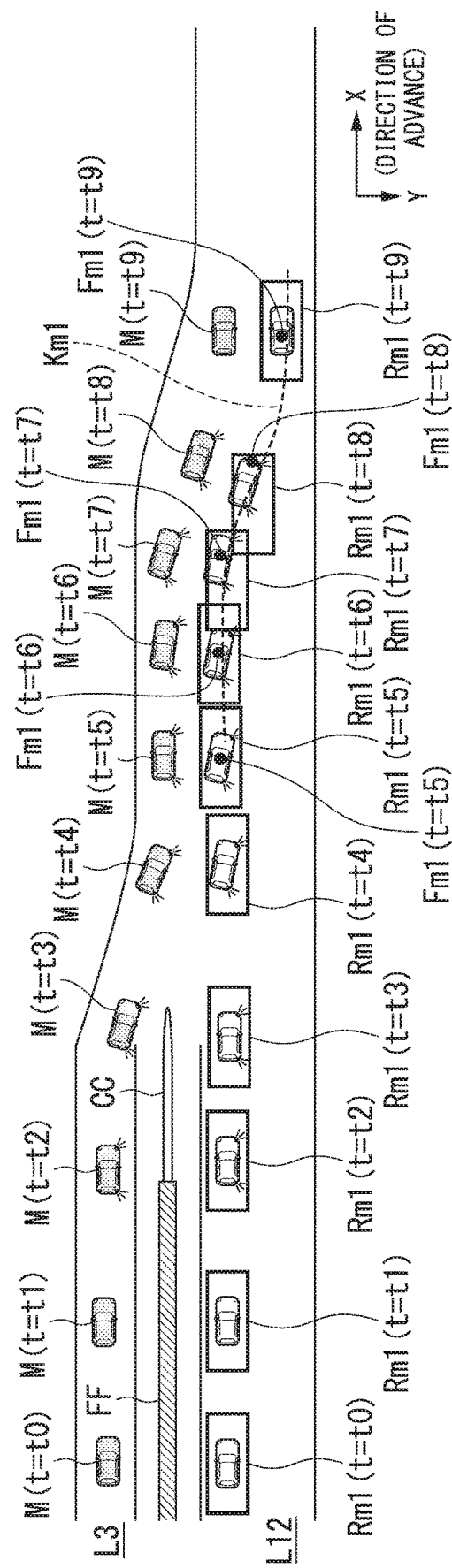
FIG. 12 is a view for describing a processing example by a curvature deriving part.

FIG. 12 is a view for describing a processing example by the curvature deriving part 134-3. FIG. 12 shows positions of the host vehicle M and the virtual frame Rm1 set on the main lane vehicle m1 by the virtual frame setting part 134-2 at the times t0 to t9 until the host vehicle M performs lane changing from the lane L3 to the lane L1. The time t0 to the time t9 show an arbitrary length of time, like the time t0 to the time t9 shown in FIG. 5.

When the marking line included in the main lane is not recognized by the marking line recognizer 135, the curvature deriving part 134-3 derives a point at which the main lane vehicle m1 has started to move in the lateral direction (an estimated point at which the lane changing has started; for example, the time t4 in the drawings), and a curvature of the traveling trajectory of the main lane vehicle m1 after starting of movement in the lateral direction. In addition, the curvature deriving part 134-3 derives a relative positional relation between the host vehicle M and the main lane vehicle mA in a longitudinal direction (an X-axis direction), a relative positional relation between the host vehicle M and the main lane vehicle mA in a lateral direction (a Y-axis direction) and a distant curvature (an advancement trajectory of the main lane vehicle m1) on the basis of the detection result of the reference place Fm1 of the main lane vehicle m1, and derives the traveling trajectory Km1 of the main lane vehicle m1 on the basis of these derived results. Accordingly, the curvatures of the lanes L1 and L2 that are the main lanes on which the marking line is not recognized can be estimated.

Figure 13:
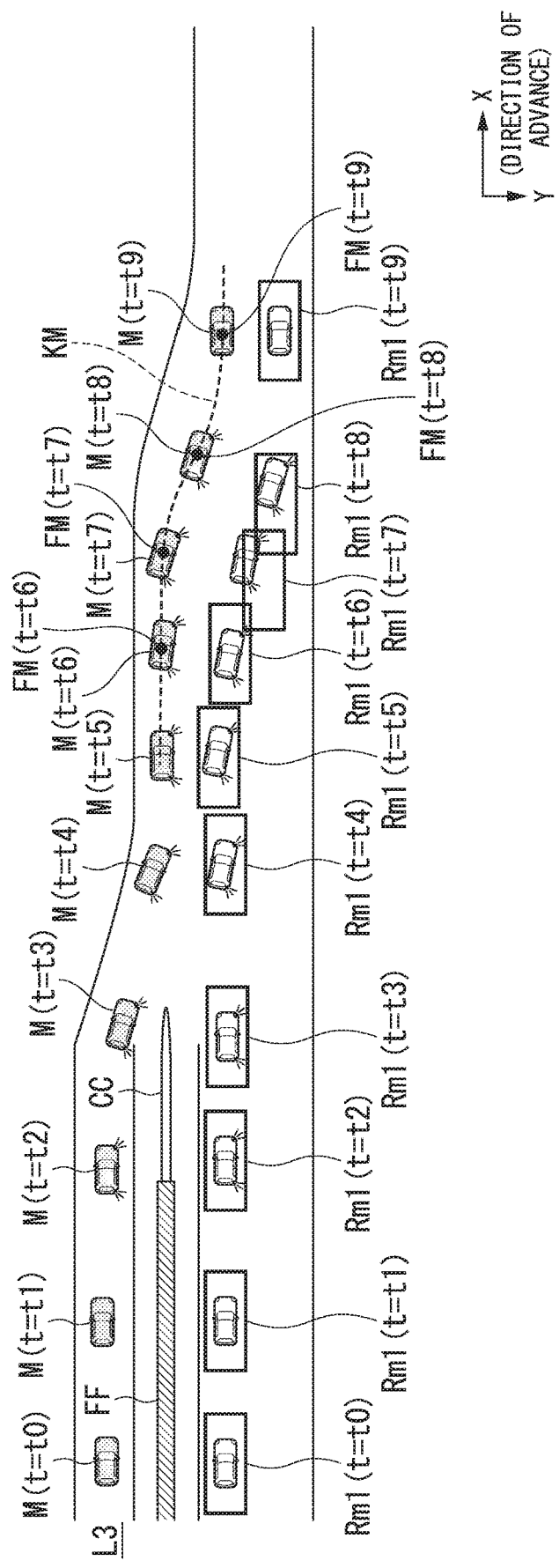
FIG. 13 is a view for describing a merging trajectory of a host vehicle.
Figure 14:
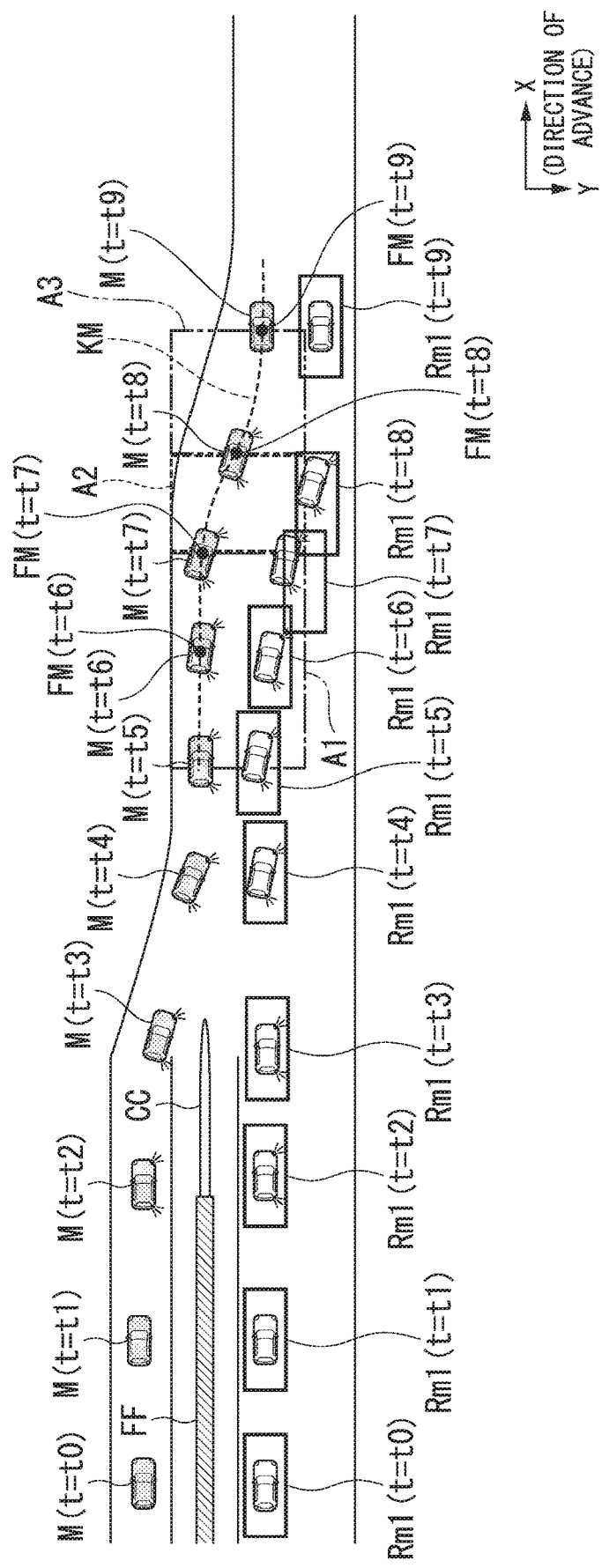
FIG. 14 is a view for describing the merging trajectory of the host vehicle.

The merging controller 142 generates a merging trajectory of the host vehicle M on the basis of a variation in curvature of a trajectory of the main lane vehicle m1 derived by the curvature deriving part 134-3. FIG. 13 and FIG. 14 are views for describing a merging trajectory of the host vehicle M.

For example, the merging controller 142 generates a merging trajectory KM of the host vehicle M on the basis of a traveling trajectory Km1 of the main lane vehicle m1 shown in FIG. 12 and/or the recognition result of the other than the main lane vehicle m1 by the surrounding recognizer 132. For example, the merging controller 142 refers to a position of the virtual frame Rm1 of the main lane vehicle m1 at the time t5 or the time t6, or the traveling trajectory Km1 of the main lane vehicle m1 at the time t5 to the time t6 when the merging trajectory KM of the host vehicle M is generated at the time t7. For example, the second controller 160 operates steering and a speed of the host vehicle M and causes the host vehicle M to travel such that a reference place FM of the host vehicle M passes through the merging trajectory KM.

For example, the merging controller 142 sets regions A1 to A3 as shown in FIG. 14 on the basis of the virtual frame Rm1 when the merging trajectory KM of the host vehicle M is generated at a time point of the time t4. The merging controller 142 refers to a control model in which a degree of acceleration or a degree of a moving amount of the host vehicle M to the main lane differs in each of the regions A1 to A3.

For example, the region A1 is a region in which deceleration control is performed to merge the host vehicle M into the main lane, and a region in which the merging controller 142 refers to a control model to perform suppression of deceleration (limit a deceleration speed) to prevent the main lane vehicle m1 become no longer being a suitable target due to excessive deceleration. For example, the region A1 corresponds to a region from the time t5 to the time t7 shown in FIG. 13. The region A1 corresponds to a region from "a first time point" to "a second time point" in the claims.

The region A2 is a region in which a control model different from that referred to in the region A1 is referred to by the merging controller 142. In addition, the region A2 is a region in which the host vehicle M actively moves in the lateral direction to merge into the main lane, and a region in which a control model configured to perform lateral speed limitation is referred to by the merging controller 142 such that a suitable positional relation with the main lane vehicle m1 can be maintained (it does not move too far in the lateral direction or get too close to the main lane vehicle m1). Further, in the region A2, a speed of the host vehicle M in the direction of advancement may be controlled to be held constantly. The region A2 corresponds to, for example, a region from the time t7 to the time t8 shown in FIG. 13. The region A2 corresponds to a region from "a second time point" to "a third time point" in the claims.

The region A3 is a region in which a control model different from that referred to in the region A1 and the region A2 is referred to by the merging controller 142. In addition, the region A3 is a region passing through at a final stage of merging control of the host vehicle M into the main lane (for example, a state in which the reference place FM of the host vehicle M has already moved from the lane L3 to the lane L1), and a region in which the control model is referred to by the merging controller 142 to shift to maintaining of the lane L1. Further, in the control model referred in the region A3, an acceleration limitation of a speed of the host vehicle M in the direction of advancement (suppression of excessive acceleration such as provision of an upper limit on an accelerating speed or the like) may be set. The region A3 corresponds to, for example, a region from the time t8 to the time t9 shown in FIG. 13. The region A3 corresponds to a region from "a third time point" to "a fourth time point" of the claims.

For example, the merging controller 142 sets the regions A1 to A3 on the basis of existence of the offset of the virtual frame Rm1 or the magnitude of the offset amount. For example, the merging controller 142 sets the region to be switched from the region A1 to the region A2 when the virtual frame Rm1 is offset not to include some of an outline of a vehicle body of the main lane vehicle m1 like the virtual frame Rm1 at the time t7. In addition, the merging controller 142 sets the region to be switched from the region A2 to the region A3 when the offsetting is cancelled like the virtual frame Rm1 of the time t9.

In this way, by controlling the virtual frame Rm1 set by the virtual frame setting part 134-2 and the merging trajectory and the acceleration of the host vehicle M on the basis of the derived results of the curvature deriving part 134-3, the merging controller 142 can merge the host vehicle M into the main lane according to the appropriate merging traveling trajectory even when the marking line cannot be recognized.

Further, the merging controller 142 may be switched to generate the traveling trajectory that controls the host vehicle M on the basis of the recognition result of the marking line or may generate the traveling trajectory further on the basis of the recognition result of the marking line in addition to the detection result of the main lane vehicle m1 when the marking line included in the main lane can be recognized by the marking line recognizer 135 in the middle of the above-mentioned control. For example, when the marking line of the main lane can be recognized at the time t8 in FIG. 13, the merging controller 142 controls the traveling at the time t9 on the basis of both of the recognition results of the virtual frame Rm1 and the marking line.

Further, while the method of adjusting the start timing of the merging control by suppressing the offset amount of the virtual frame set by the virtual frame setting part 134-2 or delaying the offset timing has been described, the merging controller 142 may adjust the start timing of the merging control using another method (without using the virtual frame). For example, according to the recognition result such as whether the marking line is recognized by the marking line recognizer 135, and whether it is recognized by the second detector 134 that the main lane vehicle is left behind without lane changing, the merging controller 142 adjusts the start timing of the merging control (by changing a threshold vale or the like) to make the merging control easier or harder to operate.

In this case, for example, the merging controller 142 may perform the following control.

(1) When the marking line is recognized by the marking line recognizer 135 and the main lane vehicle being left behind without lane changing is not recognized by the second detector 134: start timing of merging control is not adjusted.

(2) When the marking line is not recognized by the marking line recognizer 135 or the main lane vehicle being left behind without lane changing is recognized by the second detector 134: start timing of merging control is delayed further one level more in comparison with (1).

(3) When the marking line is not recognized by the marking line recognizer 135 and the main lane vehicle being left behind without lane changing is recognized by the second detector 134: start timing of merging control is delayed further one level more in comparison with (2).

Processing Flow

Figure 15:
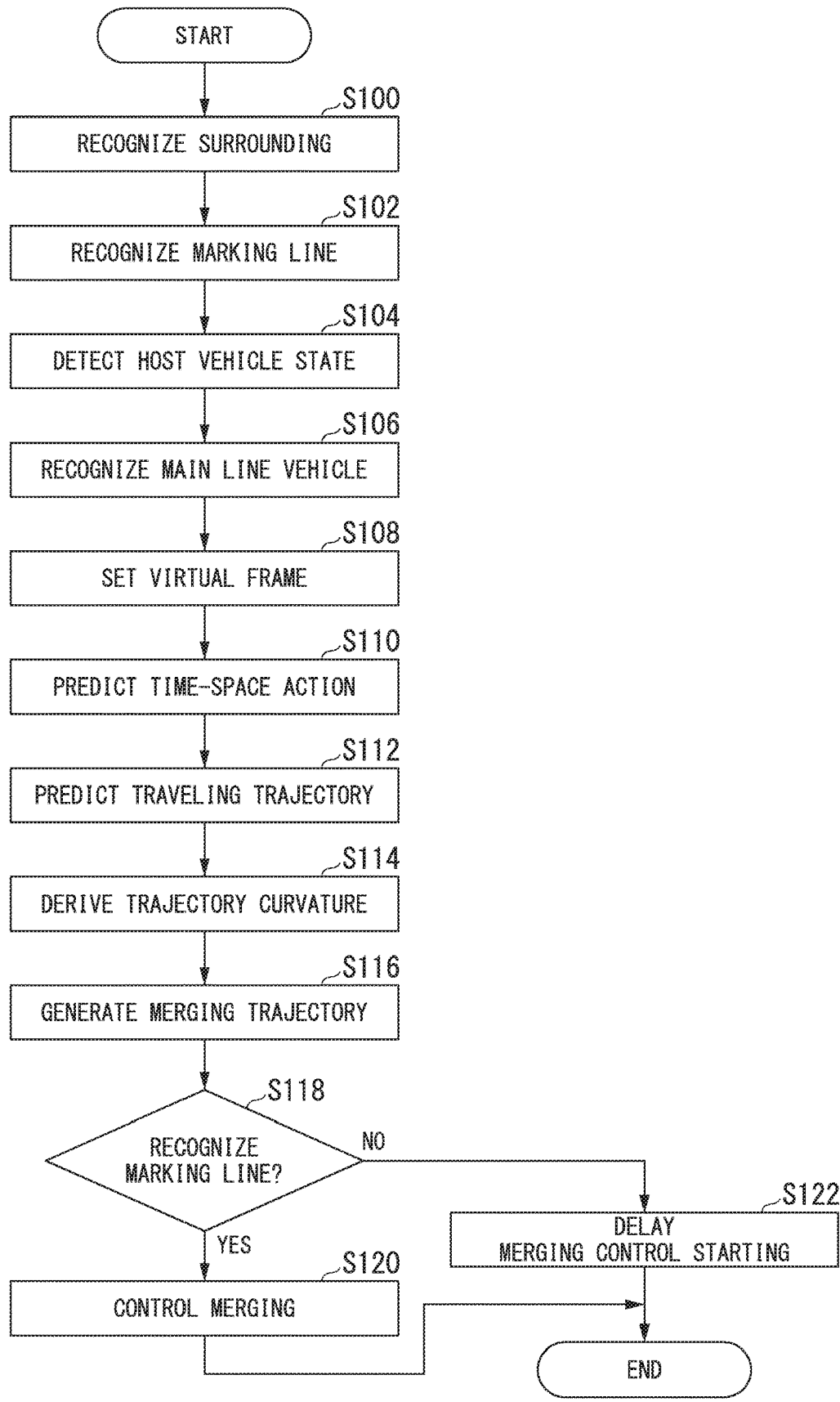
FIG. 15 is a flowchart showing an example of merging control processing by the vehicle controller.

FIG. 15 is a flowchart showing another example of merging trajectory generating processing by the vehicle controller 100.

First, the surrounding recognizer 132 recognizes a situation around the host vehicle M (step S100). Next, the marking line recognizer 135 recognizes the marking line that divides the lane included in the main lane (step S102). Next, the first detector 133 detects a state of the host vehicle M (step S104). Next, the second detector 134 detects a state of the main lane vehicle m1 (step S106). Next, the virtual frame setting part 134-2 sets the virtual frame of the main lane vehicle m1 (step S108).

Next, the second detector 134 predicts the time-space action of the main lane vehicle m1 (step S110), and predicts the target trajectory of the main lane vehicle m1 (or detects the actual traveling trajectory) (step S112). Next, the curvature deriving part 134-3 derives a curvature of the traveling trajectory of the main lane vehicle m1 (step S114). Next, the merging controller 142 generates a merging trajectory of the host vehicle M on the basis of the results in steps S102 to S114 (step S116).

Next, the marking line recognizer 135 determines whether the marking line is recognized in step S102 (step S118). Further, the marking line recognizer 135 may determine that the marking line is not recognized when the recognized marking line is broken or erased. When it is determined that the marking line is recognized, the second controller 160 controls merging of the host vehicle M on the basis of the merging trajectory generated by step S116 (step S120). When it is determined that the marking line is not recognized, the second controller 160 delays starting of the merging control further in comparison with step S120, and controls merging of the host vehicle M (step S122). Hereinabove, processing of the flowchart is terminated.

In the vehicle controller 100 of the first embodiment as described above, when the marking line that divides the lane included in the main lane cannot be detected by the marking line recognizer 135, by performing the merging control on the basis of the detection result of the main lane vehicle m1 by the second detector, in particular, the virtual frame of the main lane vehicle m1 set by the virtual frame setting part 134-2, a starting timing of the merging control of the host vehicle M is delayed further in comparison with the case in which the marking line that divides the lane included in the main lane can be detected by the marking line recognizer 135, and stable lane changing of the host vehicle can be performed.

Second Embodiment

Figure 16:
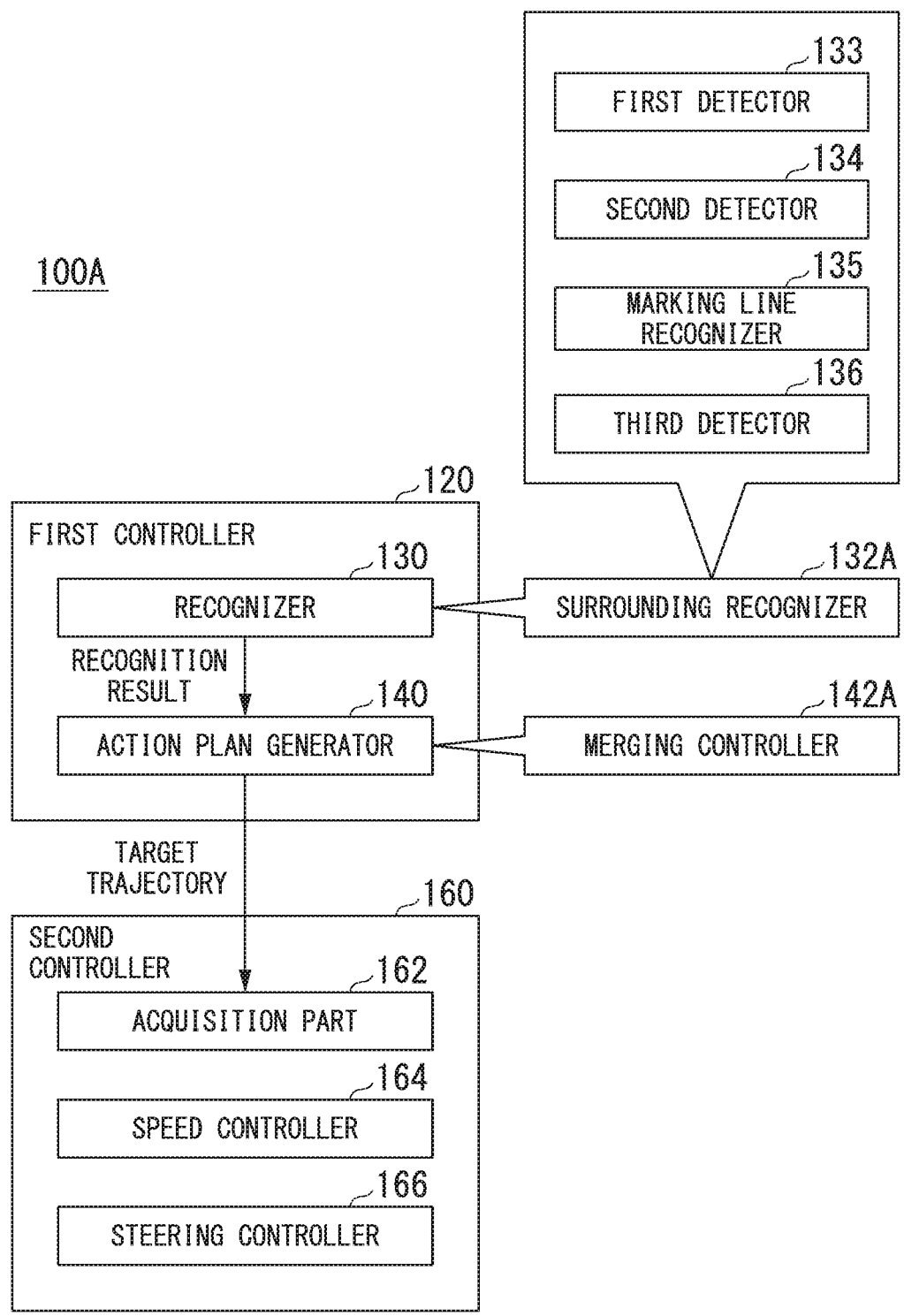
FIG. 16 is a configuration view of a vehicle system using a vehicle controller of a second embodiment.

Hereinafter, a vehicle controller of a second embodiment will be described. FIG. 16 is a configuration view of a vehicle controller 100A of the second embodiment. The vehicle controller 100A of the second embodiment is distinguished from the vehicle controller 100 of the first embodiment in that the surrounding recognizer 132A further includes a third detector 136. Hereinafter, differences therebetween will be mainly described. In addition, in the following description, elements having configurations different from those of the first embodiment will be described by adding A to the same reference numerals as those of the first embodiment.

The third detector 136 detects a state of another vehicle (hereinafter, a merging vehicle) that is traveling along a merging road and is to merge with the main lane like the host vehicle M. The third detector 136 detects a traveling state such as a traveling position, a speed, an angular speed, or the like, of another vehicle when the host vehicle M travels along the merging road.

The merging controller 142A performs merging control of merging the host vehicle M to the main lane further on the basis of the detection result by the third detector 136, in addition to detection result by the first detector 133 and the second detector 134 and the recognition result by the marking line recognizer 135. For example, when it is detected by the third detector 136 that a merging vehicle (for example, a merging vehicle m33 in the drawings) traveling behind the host vehicle M is decelerating, since the host vehicle M may decelerate to the same level as the merging vehicle that is traveling behind the host vehicle M, the merging controller 142A can control the host vehicle M more flexibly by selecting whether the host vehicle M merges to the main lane in the front or the rear of the main lane vehicle closest to the host vehicle M. In addition, for example, when the merging of the merging vehicle (a merging vehicle m31 or a merging vehicle m32 in the drawings) that is traveling in front of the host vehicle M is terminated by the third detector 136, the merging controller 142A can control the host vehicle M b more flexibly by selecting accelerating the host vehicle M to travel along the merging road and merging to the main lane at the rear of the main lane vehicle which locates further forward in the main lane, and the like.

Figure 17:
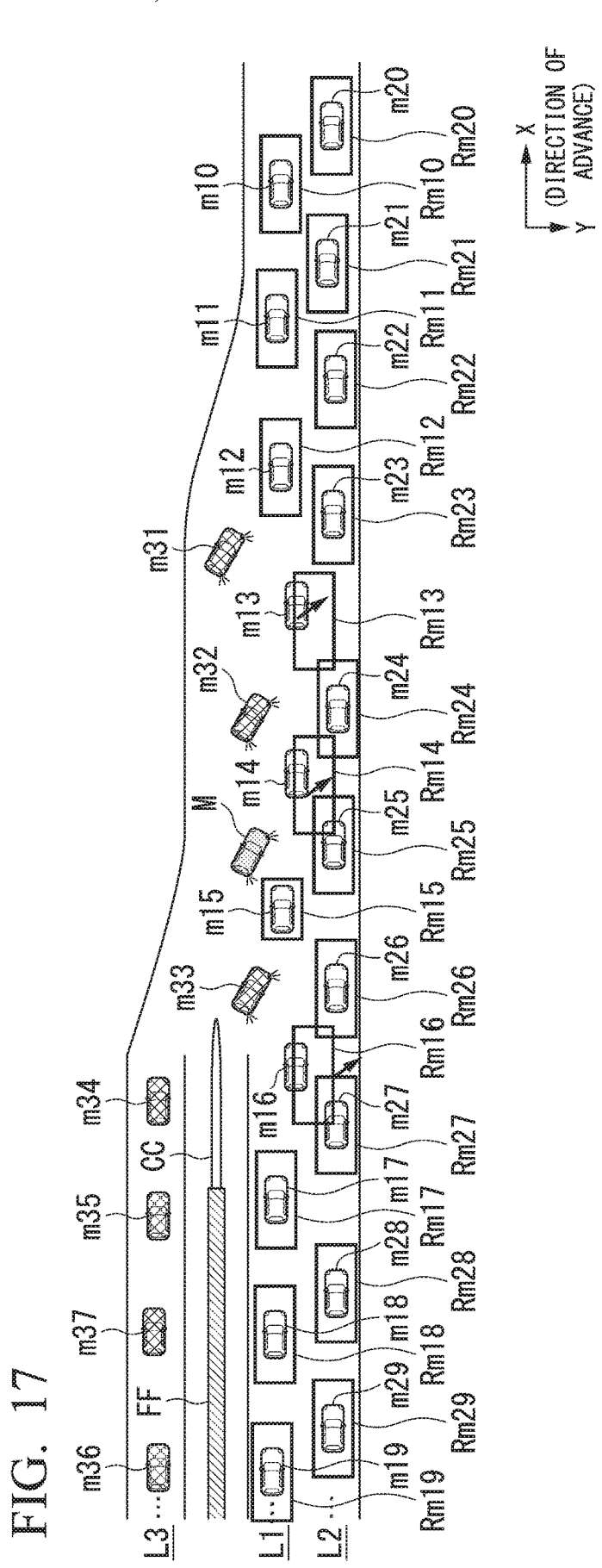
FIG. 17 is a view showing a second scene.

FIG. 17 is a view showing a second scene. While the second scene is a scene in which the host vehicle M merges to the main lane from the lane L3 that is the merging road like the first scene, the second scene is distinguished from the first scene in that the merging vehicles m31 to m37 are present in addition to the host vehicle M. In the second scene, as shown, a plurality of vehicles are traveling along the main lane like the main lane vehicles m10 to m19 that are traveling along the lane L1 or main lane vehicles m20 to m29 that are traveling along the lane L2.

In the second scene, each of the main lane vehicles m13, m14, m16 to m19 that are traveling along the lane L1 are trying to change the lane to the lane L2 to make a way for the host vehicle M and the merging vehicles m31 to 37 in the lane L3 when lane changing to the lane L2 is possible. Meanwhile, while the main lane vehicle m15 maintains to travel in the lane L1 by not being able to change to the lane L2, deceleration traveling is performed in preparation for the merging of the host vehicle M or the merging vehicles m31 to m33.

Among the merging vehicles, the third detector 136 detects, in particular, the state of the vehicle that is merging to the main lane, or the vehicle that is trying to start merging to the main lane. In addition, the virtual frame setting part 134-2 sets the virtual frames Rm10 to Rm29 with respect to the main lane vehicles m10 to m29, respectively.

Among the main lane vehicles, the second detector 134 detects, in particular, states of the main lane vehicles m12 to m16 which are while traveling along the lane L1 that has a possibility to interfere with the host vehicle M or the merging vehicle during merging and which are traveling in the region of the lane L1 adjacent to the lane L3 (not physically divided by the fence FF or the like). In the virtual frame setting part 134-2, the virtual frame of the vehicle that is changing the lane to the lane L2 is offset toward the lane L2. For example, as shown, the virtual frame setting part 134-2 offsets the virtual frames Rm12 to Rm14 and Rm16 of the main lane vehicles m12 to m14 and m16 toward the lane L2.

Figure 18:
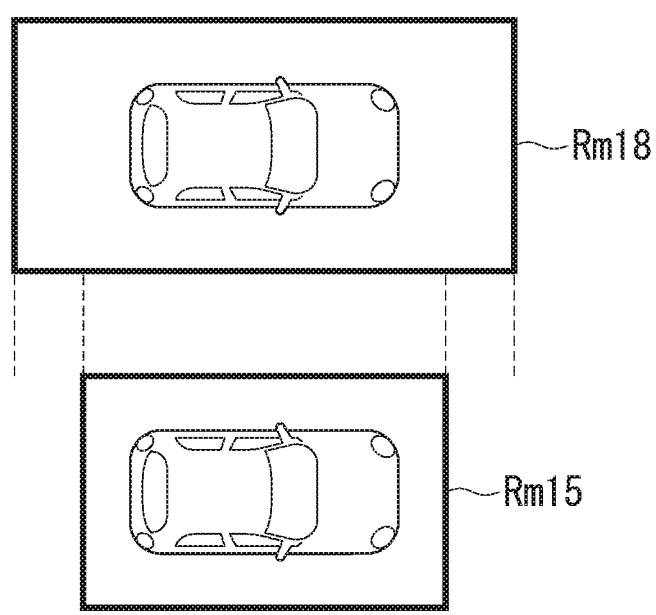
FIG. 18 is a view for describing a size of a virtual frame Rm.

FIG. 18 is a view for describing a size of the virtual frame Rm. An upper view of FIG. 18 is a view showing the virtual frame Rm18 set by the virtual frame setting part 134-2 with respect to the main lane vehicle m18 of FIG. 17. A lower view of FIG. 18 is a view showing the virtual frame Rm15 set by the virtual frame setting part 134-2 with respect to the main lane vehicle m15 of FIG. 17.

When the main lane vehicle m15 that does not perform lane changing between the lanes is detected by the second detector 134, the virtual frame setting part 134-2 shortens a length of the virtual frame Rm15 in the direction of advancement in comparison with the main lane vehicle (for example, the main lane vehicle m18) that performs lane changing between the lanes. This is assumed that the main lane vehicle m15 is cooperative with merging of other merging vehicles or the host vehicle M in consideration of that many merging vehicles try to perform merging in front of and behind the main lane vehicle m15. The merging controller 142A causes the host vehicle M to easily merge in front or behind the main lane vehicle m15. In this way, it is possible to urge the main lane vehicle to change lane by making the host vehicle M to approach the main lane, to perform warning to the main lane vehicle at behind not to perform acceleration and to make notification with respect to the other vehicle so that the host vehicle can more easily merge to the main lane. Further, in addition to that a length of the virtual frame Rm15 in the direction of advancement is reduced, a marginal distance only in front of the main lane vehicle m15 in the direction of advancement may be reduced, a marginal distance only in behind the main lane vehicle m15 in the direction of advancement may be reduced, or a length of the virtual frame Rm15 in a vehicle width direction may be reduced.

Processing Flow

Figure 19:
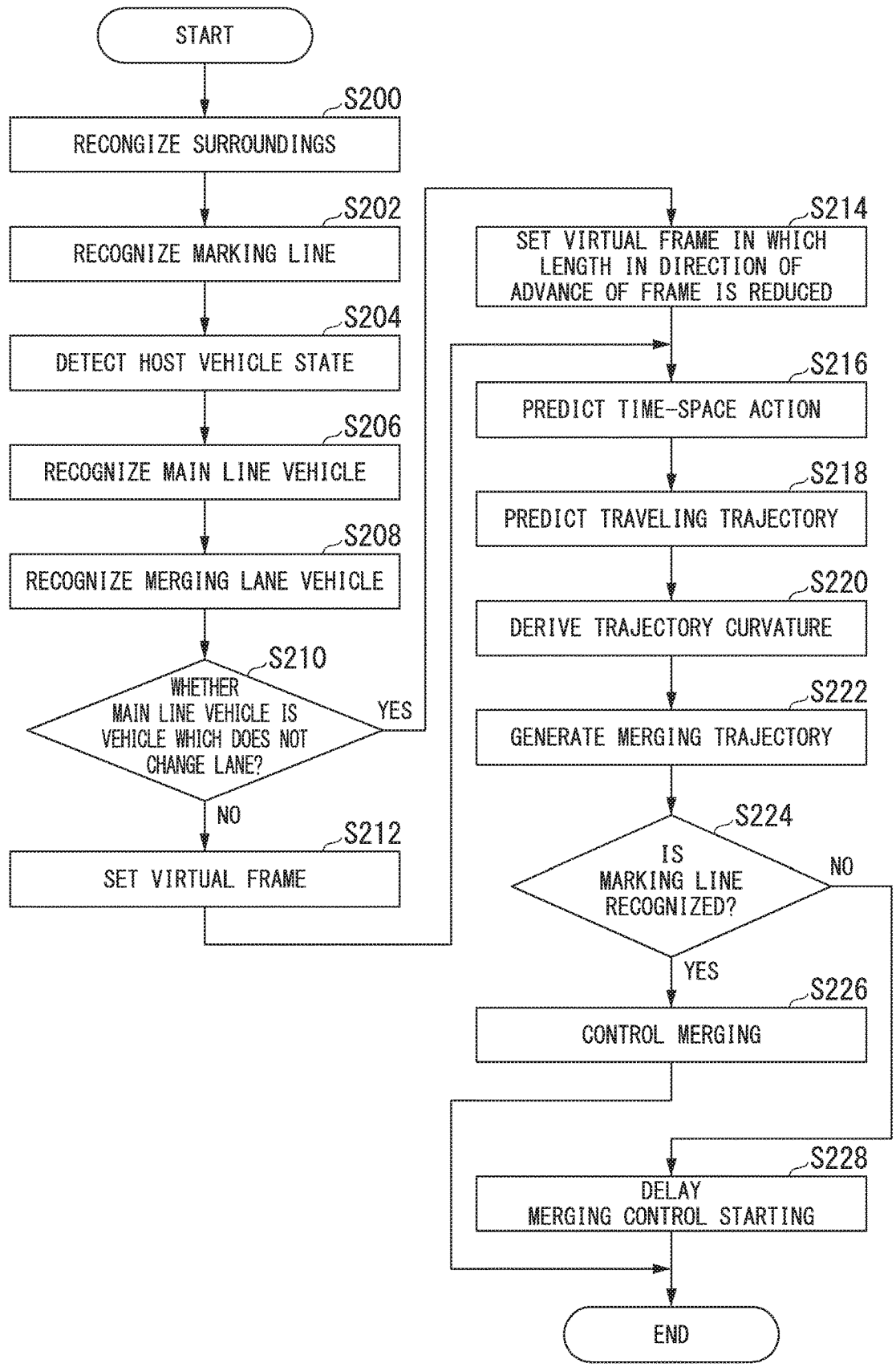
FIG. 19 is a flowchart showing an example of merging control processing by the vehicle controller of the second embodiment.

FIG. 19 is a flowchart showing another example of merging trajectory generating processing by the vehicle controller 100A of the second embodiment.

First, the surrounding recognizer 132 recognizes a surrounding situation of the host vehicle M (step S200). Next, the marking line recognizer 135 recognizes the marking line that divides the lane included in the main lane (step S202). Next, the first detector 133 detects a state of the host vehicle M (step S204). Next, the second detector 134 detects a state of the main lane vehicle (step S206). Next, the third detector 136 detects a state of the merging vehicle (step S208).

Next, the second detector 134 determines whether the main lane vehicle does not change the lane (step S210). When it is determined that it is not the main lane vehicle that does not change the lane, the virtual frame setting part 134-2 sets the virtual frame having a conventional size (step S212). When it is determined that it is a main lane vehicle that does not change the lane, the virtual frame setting part 134-2 sets the virtual frame having a smaller length frame in the direction of advancement (step S214).

After processing of step S212 and step S214, the second detector 134 and the third detector 136 predicts a time-space action of the main lane vehicle and the merging vehicle (step S216). Next, the second detector 134 predicts the target trajectory of the main lane vehicle (or detects the actual traveling trajectory of the main lane vehicle) (step S218). Next, the curvature deriving part 134-3 derives a curvature of the traveling trajectory of the main lane vehicle (step S220). Next, the merging controller 142A generates the merging trajectory of the host vehicle M on the basis of the results of steps S202 to S220 (step S222).

Next, the marking line recognizer 135 determines whether the marking line is recognized in step S202 (step S224). Further, the marking line recognizer 135 determines that the marking line is not recognized when the recognized marking line broken or erased. When it is determined that the marking line is recognized, the second controller 160 controls merging of the host vehicle M on the basis of the merging trajectory generated in step S222 (step S226). When it is not determined that the marking line is recognized, the second controller 160 delays starting of the merging control than the timing of the step S226 and controls merging of the host vehicle M (step S228). Hereinabove, processing of the flowchart is terminated.

As described above, according to the vehicle controller 100A of the second embodiment, in addition to the same effect as the vehicle controller 100 of the first embodiment, the merging control of the host vehicle M can be performed further on the basis of the recognition result of the merging vehicle by the third detector 136.

In addition, according to the vehicle controller 100A of the second embodiment, when there is a main lane vehicle that does not perform lane changing in the main lane, the host vehicle M can more smoothly perform the merging control by setting the virtual frame shortened in the direction of advancement on the vehicle by the virtual frame setting part 134-2.

In addition, according to the vehicle controller 100A of the second embodiment, it is possible to urge the other vehicles to change lane by making the host vehicle M to approach the main lane, or to make notification with repect to the other vehicle so that the host vehicle can more easily merge with the main lane.

Hardware Configuration

Figure 20:
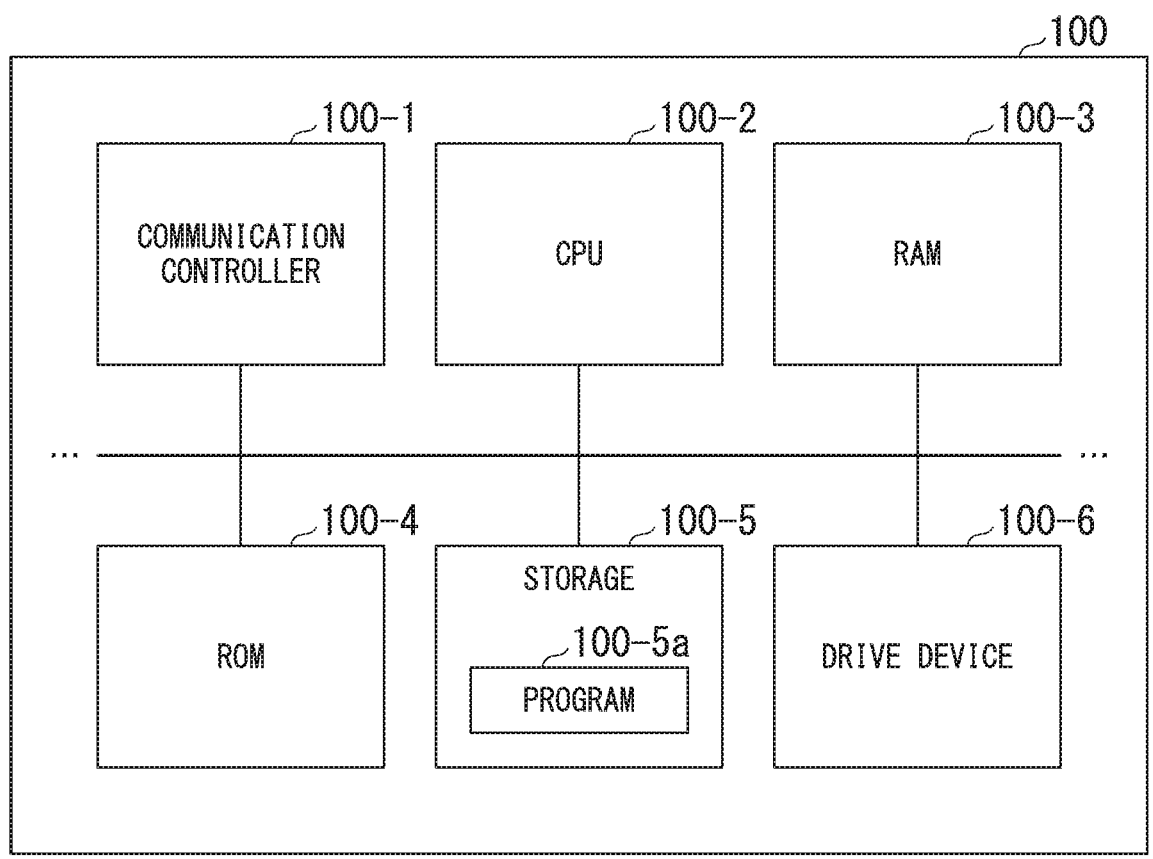
FIG. 20 is a view showing an example of a hardware configuration of the vehicle controller of the embodiment.

FIG. 20 is a view showing an example of a hardware configuration of the vehicle controller 100 of the embodiment. As shown, each of various controllers has a configuration in which a communication controller 100-1, a CPU 100-2, a RAM 100-3 used as a working memory, a ROM 100-4 on which a boot program or the like is stored, a storage 100-5 such as a flash memory, an HDD, or the like, a drive device 100-6, and the like, are connected to each other by an internal bus or a dedicated communication line. The communication controller 100-1 performs communication with the components other than the vehicle controller 100. A program 100-5a executed by the CPU 100-2 is stored in the storage 100-5. The program is installed on the RAM 100-3 by a direct memory access (DMA) controller (not shown) or the like and executed by the CPU 100-2. Accordingly, a part or all of the first controller 120 and the second controller 160 of the vehicle controller 100 is realized.

The above-mentioned embodiment can be expressed as follows.

A vehicle controller includes:
a storage on which a program is stored; and
a hardware processor,
wherein the hardware processor executes the program stored in the storage, and thus,
the vehicle controller detects a traveling state of a host vehicle,
detects a traveling state of an other vehicle that travels along a main lane when the host vehicle is traveling along a merging road, and recognizes a marking line that divides one or more lanes included in the main lane,
performs merging control of merging the host vehicle into the main lane on the basis of a detected transverse moving situation of the other vehicle, and
when a marking line that divides a plurality of lanes included in the main lane is unable to be recognized, delays starting of the merging control in comparison with a case in which the marking line that divides a plurality of lanes included in the main lane is able to be recognized.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle controller comprising:
   a first detector configured to detect a traveling state of a host vehicle;
   a second detector configured to detect a traveling state of an other vehicle that travels along a main lane when the host vehicle is traveling along a merging road;
   a marking line recognizer configured to recognize a marking line that divides one or more lanes included in the main lane; and
   a merging controller configured to perform merging control of merging the host vehicle into the main lane on the basis of a transverse moving situation of the other vehicle detected by the second detector,
   wherein, when a marking line that divides a plurality of lanes included in the main lane is unable to be recognized by the marking line recognizer, the merging controller delays starting of the merging control in comparison with a case in which the marking line that divides the plurality of lanes included in the main lane is able to be recognized by the marking line recognizer, and
   wherein the second detector virtually sets a frame including a reference place of the other vehicle with respect to the other vehicle,
   the merging controller performs the merging control on the basis of a position of the frame, and
   the second detector offsets the frame from the other vehicle in a direction separating from the merging road when it is detected that the traveling state of the other vehicle is in a lane-changing state.

2. The vehicle controller according to claim 1, wherein the second detector suppresses the offset of the frame when the marking line is not recognized by the marking line recognizer.

3. The vehicle controller according to claim 1, wherein the second detector shortens a length of the frame in a direction of advancement when the other vehicle that does not perform lane changing between the lanes included in the main line is detected in the main line in comparison with a case in which the other vehicle that performs lane changing between the lanes included in the main lane is detected.

4. The vehicle controller according to claim 1, wherein, when it is detected by the second detector that the other vehicle makes a lane change from a first lane along which the other vehicle is traveling to a second lane which is farther from the merging road than the first lane among the main lane,
   the merging controller performs:
   deceleration control of the host vehicle from a first time point when the other vehicle has started the lane change until a second time point when the other vehicle crosses a marking line,
   lateral speed limitation of the host vehicle from the second time point until a third time point when a moving speed of the other vehicle in a lateral direction with respect to a direction of advancement of the other vehicle becomes a predetermined level or less, and
   acceleration limitation of the host vehicle from the third time point until a fourth time point when the host vehicle has reached a predetermined distance before an end of the merging road.

5. The vehicle controller according to claim 1, further comprising a third detector configured to detect a traveling state of a merging vehicle that is traveling along the merging road when the host vehicle is traveling along the merging road,
   wherein the merging controller performs the merging control of the host vehicle to the main lane further based on a detection result of the third detector.

6. A vehicle control method performed by a computer, the vehicle control method comprising:
   detecting a traveling state of a host vehicle;
   detecting a traveling state of an other vehicle that travels along a main lane when the host vehicle is traveling along a merging road and recognizing a marking line that divides one or more lanes included in the main lane; and
   performing merging control of merging the host vehicle into the main lane on the basis of a detected transverse moving situation of the other vehicle,
   wherein, when a marking line that divides a plurality of lanes included in the main lane is unable to be recognized, starting of the merging control is delayed in comparison with a case in which the marking line that divides the plurality of lanes included in the main lane is able to be recognized, and
   wherein the detecting the traveling state of the other vehicle comprises virtually setting a frame including a reference place of the other vehicle with respect to the other vehicle,
   the performing merging control comprises performing the merging control on the basis of a position of the frame, and
   wherein the detecting the traveling state of the other vehicle comprises offsetting the frame from the other vehicle in a direction separating from the merging road when it is detected that the traveling state of the other vehicle is in a lane-changing state.

7. A computer-readable storage medium in which a program is stored, the program configured to cause a computer to:
   detect a traveling state of a host vehicle;
   detect a traveling state of an other vehicle that travels along a main lane when the host vehicle is traveling along a merging road,
   recognize a marking line that divides one or more lanes included in the main lane; and
   perform merging control of merging the host vehicle into the main lane on the basis of a detected transverse moving situation of the other vehicle,
   wherein, when a marking line that divides a plurality of lanes included in the main lane is unable to be recognized, starting of the merging control is delayed in comparison with a case in which the marking line that divides the plurality of lanes included in the main lane is able to be recognized, and
   wherein the detect the traveling state of the other vehicle comprises causing the computer to virtually set a frame including a reference place of the other vehicle with respect to the other vehicle,
   the perform the merging control comprises causing the computer to perform the merging control on the basis of a position of the frame, and
   wherein the detect the traveling state of the other vehicle comprises causing the computer to offset the frame from the other vehicle in a direction separating from the merging road when it is detected that the traveling state of the other vehicle is in a lane-changing state.

* * * * *